(12) United States Patent
Maejima et al.

(10) Patent No.: US 11,761,053 B2
(45) Date of Patent: Sep. 19, 2023

(54) METHOD FOR PRODUCING RAILWAY WHEEL AND RAILWAY WHEEL

(71) Applicant: NIPPON STEEL CORPORATION, Tokyo (JP)

(72) Inventors: Taketo Maejima, Tokyo (JP); Manabu Kubota, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 718 days.

(21) Appl. No.: 16/493,608

(22) PCT Filed: Mar. 30, 2018

(86) PCT No.: PCT/JP2018/013538
§ 371 (c)(1),
(2) Date: Sep. 12, 2019

(87) PCT Pub. No.: WO2018/181862
PCT Pub. Date: Oct. 4, 2018

(65) Prior Publication Data
US 2020/0102623 A1    Apr. 2, 2020

(30) Foreign Application Priority Data

Mar. 31, 2017   (JP) ................................ 2017-070847
Jan. 31, 2018   (JP) ................................ 2018-014271

(51) Int. Cl.
*C22C 38/00*    (2006.01)
*C22C 38/02*    (2006.01)
(Continued)

(52) U.S. Cl.
CPC ............ *C21D 9/34* (2013.01); *B60B 17/0006* (2013.01); *C21D 6/002* (2013.01); *C21D 6/005* (2013.01);
(Continued)

(58) Field of Classification Search
CPC ..... C22C 38/001; C22C 38/002; C22C 38/02; C22C 38/04; C22C 38/06; C22C 38/24; B60B 17/00
(Continued)

(56) References Cited

U.S. PATENT DOCUMENTS

2015/0147224 A1*   5/2015   Kato ....................... C22C 38/08
                                                  420/92
2017/0191149 A1    7/2017   Kimura et al.

FOREIGN PATENT DOCUMENTS

CA      2451147 A1    7/2013
CN    106460117 A     2/2017
(Continued)

OTHER PUBLICATIONS

Satyendra, "Nitrogen in Steels" May 23, 2013, Ispat Guru, URL: <https://www.ispatguru.com/nitrogen-in-steels/> pp. 1-10 (Year: 2013).*

*Primary Examiner* — Humera N. Sheikh
*Assistant Examiner* — Katherine A Christy
(74) *Attorney, Agent, or Firm* — Greer, Burns & Crain, Ltd.

(57) ABSTRACT

A railway wheel having, in mass %, C: 0.80 to 1.15%, Si: 1.00% or less, Mn: 0.10 to 1.25%, P: 0.050% or less, S: 0.030% or less, Al: 0.025 to 0.650%, N: 0.0030 to 0.0200%, Cr: 0 to 0.60%, and V: 0 to 0.12%, with the balance being Fe and impurities. The railway wheel has a hub part, a rim part including a tread and a flange, and a web part disposed between the hub part and the rim part. The area fraction of pearlite in the hub, web, and rim parts is 95% or more, and the amount of pro-eutectoid cementite is not more than 1.0 pieces/100 μm. The amount of pro-eutectoid cementite is calculated as (pieces/100 μm)=a total sum of the number of
(Continued)

pieces of pro-eutectoid cementite which intersect with two diagonal lines in a square visual field of 200 μm×200 μm/(5.66×100 μm).

2 Claims, 7 Drawing Sheets

(51) Int. Cl.
C22C 38/04 (2006.01)
C22C 38/06 (2006.01)
C22C 38/24 (2006.01)
C21D 9/34 (2006.01)
B60B 17/00 (2006.01)
C21D 6/00 (2006.01)

(52) U.S. Cl.
CPC ............ *C21D 6/008* (2013.01); *C22C 38/001* (2013.01); *C22C 38/002* (2013.01); *C22C 38/02* (2013.01); *C22C 38/04* (2013.01); *C22C 38/06* (2013.01); *C22C 38/24* (2013.01); *B60B 17/00* (2013.01); *B60B 17/0068* (2013.01)

(58) Field of Classification Search
USPC .......................................................... 295/30
See application file for complete search history.

(56) References Cited

FOREIGN PATENT DOCUMENTS

| | | |
|---|---|---|
| JP | 09202937 A | 8/1997 |
| JP | 2004315928 A | 11/2004 |
| JP | 2012107295 A | 6/2012 |
| JP | 2013231212 A | 11/2013 |

* cited by examiner

METHOD FOR PRODUCING RAILWAY WHEEL AND RAILWAY WHEEL

This is a National Phase Application filed under 35 U.S.C. § 371, of International Application No. PCT/JP2018/013538, filed Mar. 30, 2018, the contents of which are incorporated by reference.

TECHNICAL FIELD

The present invention relates to a method for producing a railway wheel and a railway wheel.

BACKGROUND ART

A railway vehicle travels on a rail constituting a railway track. A railway vehicle includes a plurality of railway wheels. The railway wheel supports the vehicle keeping in contact with the rail and moves on the rail while rotating thereon. The railway wheel wears due to the contact with the rail. For the purpose of increasing the efficiency of railway transportation, attempts have been made to increase the loading weight on the railway vehicle, and increase the speed of the railway vehicle. As a result, there is a demand for improvement in wear resistance for railway wheels used for a railway vehicle.

Technologies to improve wear resistance of a railway wheel have been proposed in Japanese Patent Application Publication No. 09-202937 (Patent Literature 1), Japanese Patent Application Publication No. 2012-107295 (Patent Literature 2), Japanese Patent Application Publication No. 2013-231212 (Patent Literature 3), and Japanese Patent Application Publication No. 2004-315928 (Patent Literature 4).

The railway wheel disclosed in Patent Literature 1 consists of, in mass %, C: 0.4 to 0.75%, Si: 0.4 to 0.95%, Mn: 0.6 to 1.2%, Cr: 0 to 0.2% or less, P: 0.03% or less, and S: 0.03% or less, with the balance being Fe and other unavoidable impurities. In this railway wheel, a region from the surface of the wheel tread part to a depth of at least 50 mm is composed of a pearlite structure. The production method of a railway wheel of Patent Literature 1 includes a quenching step in which the wheel tread part is cooled in a condition that a cooling curve of the wheel tread part passes through a pearlite forming region in a continuous cooling transformation curve, and resides on the long-time side of the martensite transformation curve.

The wheel steel disclosed in Patent Literature 2 has a chemical composition consisting of, in mass %, C: 0.65 to 0.84%, Si: 0.02 to 1.00%, Mn: 0.50 to 1.90%, Cr: 0.02 to 0.50%, V: 0.02 to 0.20%, and S: 0.04% or less, with the balance being Fe and impurities, wherein P≤0.05%, Cu≤0.20%, and Ni≤0.20%. The chemical composition further satisfies the following relational formulae:

$$[34 \leq 2.7 + 29.5 \times C + 2.9 \times Si + 6.9 \times Mn + 10.8 \times Cr + 30.3 \times Mo + 44.3 \times V \leq 43]$$ and $$[0.76 \times \exp(0.05 \times C) \times \exp(1.35 \times Si) \times \exp(0.38 \times Mn) \times \exp(0.77 \times Cr) \times \exp(3.0 \times Mo) \times \exp(4.6 \times V) \leq 25]$$

Patent Literature 2 states that the steel for railway wheel achieves excellent wear resistance, rolling fatigue resistance, and spalling resistance by satisfying the above described chemical composition and the formulae.

The wheel steel disclosed in Patent Literature 3 consists of, in mass %, C: 0.65 to 0.84%, Si: 0.4 to 1.0%, Mn: 0.50 to 1.40%, Cr: 0.02 to 0.13%, S: 0.04% or less, V: 0.02 to 0.12%, with the balance being Fe and impurities, wherein Fill defined by Formula (1) is 32 to 43, and Fn2 defined by Formula (2) is 25 or less. Where, Formula (1) is Fn1=2.7+29.5C+2.9Si+6.9Mn+0.8Cr+30.3Mo+44.3V, and Formula (2) is Fn2=exp(0.76)×exp(0.05C)×exp(1.35Si)×exp(0.38Mn)×exp(0.77Cr)×exp(3.0Mo)×exp(4.6V)

Patent Literature 3 states that the steel for railway wheel achieves excellent wear resistance, rolling fatigue resistance, and spalling resistance when it has the above described chemical composition, and Fn1 and Fn2 satisfy the above described range.

The railway vehicle wheel disclosed in Patent Literature 4 is an integrated railway vehicle wheel composed of steel containing a chemical composition consisting of, in mass %, C: 0.85 to 1.20%, Si: 0.05 to 2.00%, Mn: 0.05 to 2.00%, and further as needed, a predetermined amount of one or more elements selected from Cr, Mo, V, Nb, B, Co, Cu, Ni, Ti, Mg, Ca, Al Zr, and N, with the balance being Fe and other unavoidable impurities, wherein at least part of the tread and/or the flange surface of the wheel has a pearlite structure. Patent Literature 4 states that the life of the railway vehicle wheel depends on the amount of wear of the tread and the flange surface (paragraph [0002] of Patent Literature 4), and further depends on a crack in the tread and the flange surface which is caused by increase in calorific value when brake is applied in a high-speed railway. It also states that when the railway vehicle wheel has the above described configuration, it is possible to suppress wear and heat crack of the tread and the flange surface.

CITATION LIST

Patent Literature

Patent Literature 1: Japanese Patent Application Publication No. 09-202937
Patent Literature 2: Japanese Patent Application Publication No. 2012-107295
Patent Literature 3: Japanese Patent Application Publication No, 2013-231212
Patent Literature 4: Japanese Patent Application Publication No. 2004-315928

Non Patent Literature

Non Patent Literature 1: F. Wever et al., Zur Frage der Warmebehandlung der Stahle auf Grund ihrer Zeit-Temperatur-Umwandlungs-Schaubilder, Stahl u Eisen, 74 (1954), p 749 to 761

SUMMARY OF INVENTION

Technical Problem

In the railway wheels disclosed in the above described Patent Literatures 1, 2, and 3, wear resistance of railway wheel is improved by actively containing V. However, when the railway wheels of these literatures are applied to a freight railway for which increasing of loading weight and raising of speed are required, sufficient wear resistance may not be obtained.

On the other hand, the railway wheel disclosed in Patent Literature 4 is made of a hyper-eutectoid steel in which the C content is increased in contrast to Patent Literatures 1, 2, and 3. When this railway wheel is applied to a freight railway for which increasing of loading weight and raising of speed are required, sufficient wear resistance may potentially be obtained.

Meanwhile, the railway wheel is produced in the following way. A billet is subjected to hot working to form an intermediate product having a railway wheel shape. The formed intermediate product is subjected to heat treatment (tread quenching), In the tread quenching, after the intermediate product is heated, cooling water is sprayed onto the tread and the flange of the intermediate product to rapidly cool it. Note that, while the tread and the flange are rapidly cooled, a hub (boss) part and a web part are allowed to cool. As a result, fine pearlite which has high wear resistance is formed in the matrix structure of an outer layer immediately below the tread and a near-surface portion of the flange.

However, in the outer layer immediately below the tread and the near-surface portion of the flange after tread quenching, a layer composed of martensite and/or bainite is further formed in a layer above the fine pearlite. Hereinafter, the layer which is composed of martensite and/or bainite formed in the outer layer of the tread and the outer layer of the flange by rapid cooling of the tread and the flange after heat treatment is herein called a "quenched layer", When a railway wheel having a quenched layer in the outer layer of the tread and the outer layer of the flange is used, the quenched layer is likely to wear during use of the railway wheel. For that reason, in a traditional production process of a railway wheel, a quenched layer formed in the outer layer of the tread and the outer layer of the flange is removed by cutting to cause fine pearlite to be exposed to the surfaces of the tread and the flange for the intermediate product of railway wheel after tread quenching. By the above described production process, a conventional railway wheel is produced.

However, it was found from an investigation by the present inventors that when the railway wheel is a hypereutectoid steel such as one of Patent Literature 4, toughness of the hub part and the web part may deteriorate in a conventional production method of a railway wheel, in a conventional railway wheel, although the structure of the tread and the flange of the rim part has been investigated for the purpose of prolonging the life of the railway wheel, there has been no investigation made focusing on the structure of the hub part and the web part of the railway wheel.

It is an object of the present invention to provide a method for producing a railway wheel, which enables stable production of a railway wheel of a hyper-eutectoid steel having excellent toughness, and a railway wheel.

Solution to Problem

A method for producing a railway wheel according to an embodiment of the present invention includes a heating step and a cooling step. In the heating step, an intermediate product of railway wheel which has a chemical composition consisting of, in mass %, C: 0.80 to 1.15%, Si: 1.00% or less, Mn: 0.10 to 1.25%, P: 0.050% or less, S: 0.030% or less, Al: 0.025 to 0.650%, N: 0.0030 to 0.0200%, Cr: 0 to 0.60%, and V: 0 to 0.12%, with the balance being Fe and impurities, and includes a hub part, a rim part having a tread and a flange, and a web part disposed between the hub part and the rim part is heated to not less than the $A_{cm}$ transformation point (° C.). In the cooling step, the intermediate product is cooled such that: the cooling rate in a range from 800 to 500° C. at the surface other than the tread and the flange surface in the intermediate product is not more than Fn1° C./sec which is defined by Formula (1); the cooling rate in a range from 800 to 500° C. in a region in which the cooling rate is slowest in the intermediate product is not less than Fn2° C./sec which is defined by Formula (2); and the cooling rate in a range from 800 to 500° C. at the tread and the flange surface is not less than Fn2° C./sec:

$$Fn1=-5.0+\exp(5.651-1.427\times C-1.280\times Si-0.7723\times Mn-1.815\times Cr-1.519\times Al-7.798\times V) \quad (1)$$

$$Fn2=0.515+\exp(-24.816+24.121\times C+1.210\times Si+0.529\times Mn+2.458\times Cr-15.116\times Al-5.116\times V) \quad (2)$$

where, each symbol of element in Formulae (1) and (2) is substituted by the content (mass %) of the corresponding element.

A railway wheel according to the present embodiment has a chemical composition consisting of, in mass %, C: 0.80 to 1.15%, Si: 1.00% or less, Mn: 0.10 to 1.25%, P: 0.050% or less, S: 0.030% or less, Al: 0.025 to 0.650%, N: 0.0030 to 0.0200%, Cr: 0 to 0.60%, and V: 0 to 0.12%, with the balance being Fe and impurities, and includes a hub part, a rim part having a tread and a flange, and a web part disposed between the hub part and the rim part. In the microstructure of the hub part, the area fraction of pearlite is 95% or more, and the amount of pro-eutectoid cementite defined by Formula (A) is not more than 1.0 pieces/100 μm. In the microstructure of the web part, the area fraction of pearlite is 95% or more, and the amount of pro-eutectoid cementite defined by Formula (A) is not more than 1.0 pieces/100 μm. In the microstructure of the rim part, the area fraction of pearlite is 95% or more, and the amount of pro-eutectoid cementite defined by Formula (A) is not more than 1.0 pieces/100 μm.

$$\text{Amount of pro-eutectoid cementite (pieces/100 μm)=a total sum of the number of pieces of pro-eutectoid cementite which intersect with two diagonal lines in a square visual field of 200 μm×200 μm/(5.66×100 μm)} \quad (A)$$

Advantageous Effects of Invention

The method for producing a railway wheel according to the present embodiment enables stable production of a railway wheel of a hyper-eutectoid steel having excellent toughness.

DESCRIPTION OF EMBODIMENTS

[Configuration of Railway Wheel]

Figure 1:
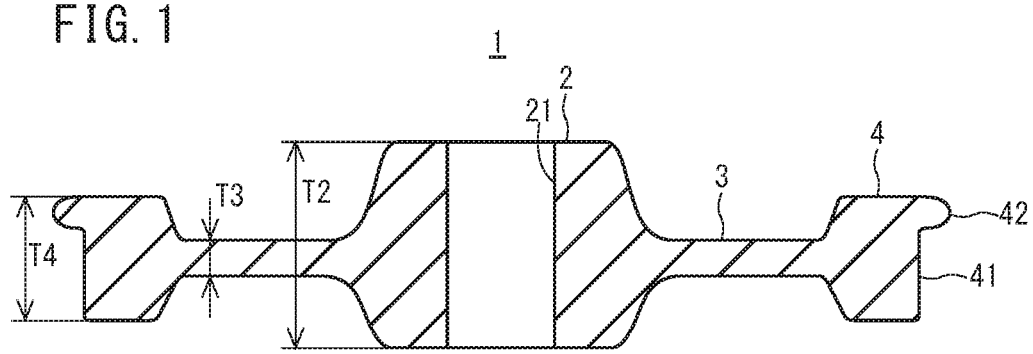
FIG. 1 is a cross sectional view in parallel with the center axis of a railway wheel.

FIG. 1 is a cross sectional view including a center axis of a railway wheel. Referring to FIG. 1, a railway wheel 1 has a disc shape and includes a hub part 2, a web part 3, and a rim part 4. The hub part 2 has a cylindrical shape and is disposed in the middle part of the railway wheel 1. The hub part 2 has a through hole 21. The center axis of the through hole 21 corresponds to the center axis of the railway wheel 1. An axle shaft not shown is inserted into the through hole 21. A thickness T2 of the hub part 2 is larger than a thickness T3 of the web part 3. The rim part 4 is formed in an edge part in the outer circumference of the railway wheel 1. The rim part 4 includes a tread 41 and a flange 42. The tread 41 is linked with the flange 42. The surfaces of the tread 41 and the flange 42 are in contact with the rail surface while the railway wheel 1 is being used. A thickness T4 of the rim part 4 is larger than the thickness T3 of the web part 3. The web part 3 is disposed between the hub part 2 and the rim part 4. The inner circumferential edge part of the web part 3 is linked with the hub part 2, and the outer circumference edge part of the web part 3 is linked with the rim part 4. The thickness T3 of the web part 3 is smaller than the thickness T2 of the hub part 2 and the thickness T4 of the rim part 4.

The present inventors have studied the method for improving wear resistance in a railway wheel. As a result, the present inventors have obtained the following findings.

[Improvement in Wear Resistance Due to Increase in C Content]

Figure 2:
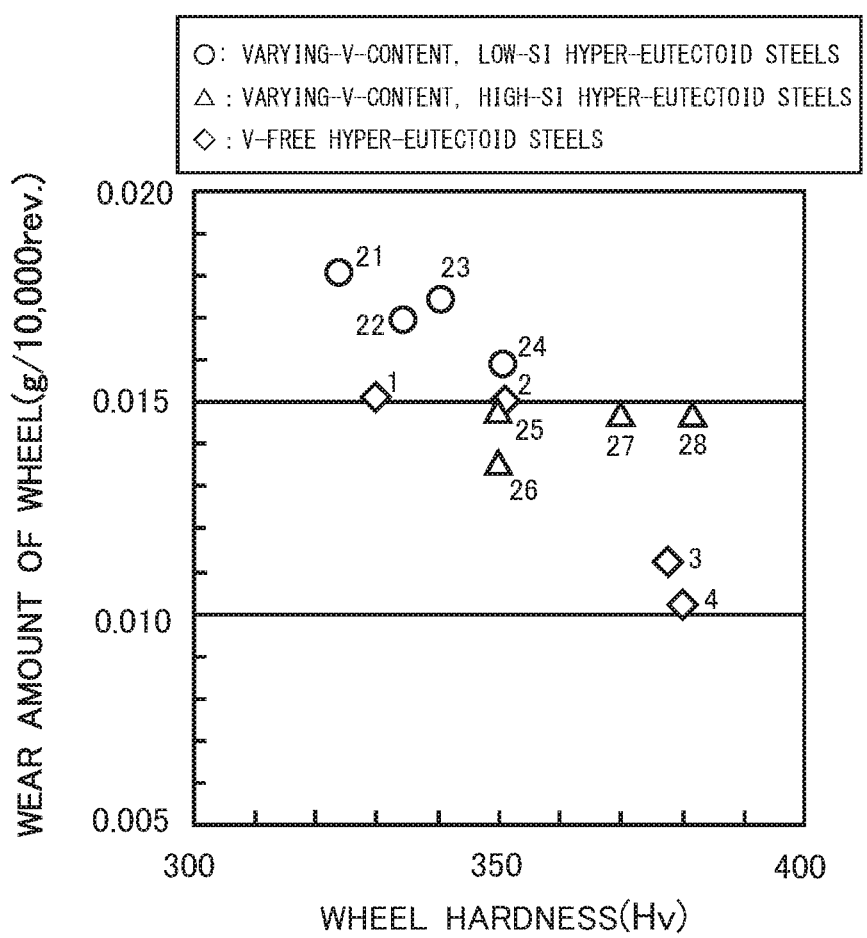
FIG. 2 is diagram illustrating a relationship between the Vickers hardness of a railway wheel and the wear amount of the railway wheel based on the result of a Nishihara-type wear test.

FIG. 2 is a diagram illustrating a relationship between the Vickers hardness of a railway wheel and the wear mount of the railway wheel based on the result of a Nishihara-type wear test. FIG. 2 is obtained from the following experiment, A round bar with a diameter of 40 mm was produced from each of ingots having chemical compositions shown in Table 1.

TABLE 1

| Steel No. | Chemical composition (unit is mass %, the balance being Fe and impurities) | | | | | | | | |
|---|---|---|---|---|---|---|---|---|---|
| | C | Si | Mn | S | Al | N | P | Cr | V |
| 1 | 0.84 | 0.30 | 0.81 | 0.002 | 0.032 | 0.0038 | 0.001 | — | — |
| 2 | 0.93 | 0.29 | 0.80 | 0.002 | 0.032 | 0.0042 | 0.001 | — | — |
| 3 | 1.00 | 0.30 | 0.80 | 0.002 | 0.034 | 0.0040 | 0.001 | — | — |
| 4 | 1.09 | 0.30 | 0.79 | 0.002 | 0.036 | 0.0040 | 0.001 | — | — |
| 21 | 0.79 | 0.29 | 0.81 | 0.002 | 0.035 | 0.0030 | 0.001 | 0.10 | — |
| 22 | 0.76 | 0.29 | 0.79 | 0.001 | 0.034 | 0.0026 | 0.001 | 0.08 | 0.028 |
| 23 | 0.75 | 0.29 | 0.80 | 0.002 | 0.034 | 0.0033 | 0.001 | 0.10 | 0.058 |
| 24 | 0.75 | 0.29 | 0.80 | 0.002 | 0.034 | 0.0032 | 0.001 | 0.10 | 0.097 |
| 25 | 0.78 | 0.75 | 0.82 | 0.002 | 0.036 | 0.0038 | 0.001 | 0.10 | — |
| 26 | 0.75 | 0.77 | 0.79 | 0.001 | 0.038 | 0.0034 | 0.001 | 0.09 | 0.028 |
| 27 | 0.77 | 0.77 | 0.81 | 0.001 | 0.033 | 0.0032 | 0.001 | 0.10 | 0.058 |
| 28 | 0.76 | 0.76 | 0.82 | 0.001 | 0.036 | 0.0027 | 0.001 | 0.10 | 0.096 |

A rough test specimen (corresponding to an intermediate product of railway wheel) of an annular shape with a diameter of 32 mm and a width of 10 mm was made from the round bar.

The rough test specimen was subjected to quenching which simulated tread quenching in a railway wheel. Specifically, the rough test specimen of each steel number was held at a heat treatment temperature of 950° C. for 20 minutes. After the hold, to form a fine pearlite structure, the rough test specimen was taken out from the furnace to be immersed in a salt bath of 550° C. The immersion time in the salt bath was 7 minutes. When 7 minutes elapsed after the rough test specimen was immersed in the salt bath, the rough test specimen was taken out from the salt bath and was allowed to cool to the normal temperature (25° C.). To simulate tempering during production of a wheel, each rough test specimen after being allowed to cool was held at a heat treatment temperature of 450° C. for 3 hours. After the rough test specimen was held at a heat treatment temperature of 450° C. for 3 hours, the rough test specimen was allowed to cool to the normal temperature (25° C.).

Figure 3:
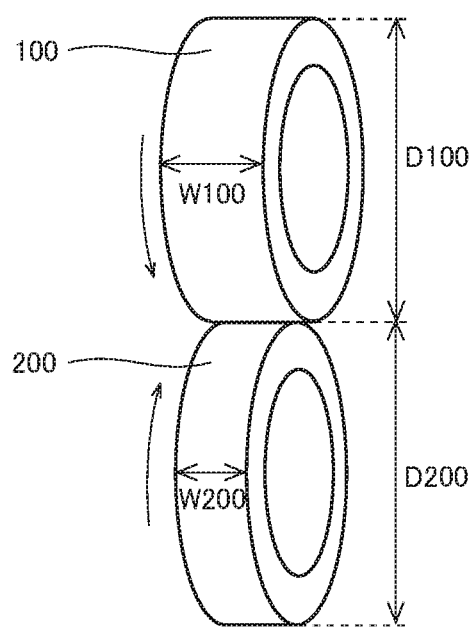
FIG. 3 is a schematic diagram of the Nishihara-type wear test.

After being allowed to cool, the rough test specimen was cut in its outer peripheral surface to make a wheel test specimen 100 (corresponding to a railway wheel) having a cylindrical shape shown in FIG. 3. The wheel test specimen 100 had a diameter D100 of 29.39 mm and a width W100 of 8 mm.

Further, Steel No. 29 shown in Table 2 was prepared as a rail material.

TABLE 2

| Steel No. | Chemical composition (unit is mass %, the balance being Fe and impurities) | | | | | | |
|---|---|---|---|---|---|---|---|
| | C | Si | Mn | P | S | Cr | V |
| 29 | 0.99 | 0.51 | 0.71 | 0.011 | 0.008 | 0.22 | — |

A rail test specimen 200 of annular shape shown in FIG. 3 was made from the rail material of Steel No. 29. The rail test specimen 200 had a diameter D200 of 30.0 mm and a width W200 of 5 mm.

The metal structure in a position of the wheel test specimen 100 at a depth of 2 to 3 mm from the outer peripheral surface toward the center axis was observed by using an optical microscope with a magnification of 500. Similarly, the metal structure at a position of the rail test specimen 200 at a depth of 2 to 3 mm from the outer peripheral surface toward the center axis was observed by using an optical microscope with a magnification of 500. As a result of structural observation, the structure of any of the wheel test specimens 100 of Steel Nos. 1 to 4, 21 to 28 was of a pearlite single phase, and the structure of the rail test specimen 200 was of a pearlite single phase as well.

Moreover, in the wheel test specimen 100, in the same position as that of structure observation, that is, in a position at a depth of 2 to 3 mm from the outer peripheral surface toward the center axis, a Vickers hardness test conforming to JIS Z2244 (2009) was conducted. Test forces were all 2.9421 N. Similarly, in the rail test specimen 200, in the same position as that of structural observation, that is, in a position at a depth of 2 to 3 mm from the outer peripheral surface toward the center axis, a Vickers hardness test conforming to JIS Z2244 (2009) was conducted. The test force was 2.9421 N. As a result, the Vickers hardness (HV) of the rail test specimen 200 was 430.

A width center of the outer peripheral surface of the wheel test specimen 100 and a width center of the outer peripheral surface of the rail test specimen 200 were brought into contact with each other, and the wear test was conducted by mutually rotating the wheel test specimen 100 and the rail test specimen 200 while being abut against each other at a force of 900 MPa. The rotational speed of the wheel test specimen 100 was 800 rpm, and the rotational speed of the rail test specimen 200 was 775 rpm. Therefore, a slip ratio between the wheel test specimen 100 and the rail test specimen 200 was 1.1%. After the wheel test specimen 100 was rotated 500,000 revolutions, the mass (g) of the wheel test specimen 100 after test was determined. Then, difference between the mass (g) of the wheel test specimen 100 before test which had been measured before test and the mass (g) of the wheel test specimen 100 after test was determined, and this mass difference divided by 50 was defined as the wear amount of wheel (g/10,000 rev.). Note that, four of the wheel test specimens 100 were prepared for each steel number and the same test was conducted 4 times for each steel number by using these test specimens. An average value of the wear amounts of the wheel test specimens 100 which had been obtained in the four times of test was calculated as the wear amount of railway wheel of each steel number. The Vickers hardness and the wear amount of the wheel test specimen 100 obtained in each steel number were used to create FIG. 2.

The symbol "◇" in FIG. 2 indicates a test result by use of V-free steels in which the Si content is approximately constant at about 0.3%, and the C content is varied from 0.8 to 1.1% (hereinafter, referred to as "V-free hyper-eutectoid steels"). The symbol "○" indicates test results by use of steels in which the C content is within a range of 0.75 to 0.79%, the Si content is approximately constant at about 0.3%, and the V content is varied from 0 to about 0.1% (hereinafter, referred to as "varying-V-content, low-Si hyper-eutectoid steels"). The symbol "Δ" indicates test results by use of steels in which the C content is within a range of 0.75 to 0.79%, the Si content is approximately constant at about 0.8%, and the V content is varied from 0 to about 0.1% (hereinafter, referred to as "varying-V-content, high-Si hyper-eutectoid steels"). A numeral beside each symbol in FIG. 2 indicates a steel number of Table 1.

Referring to FIG. 2, as the V content increased, the \Tickers hardness of wheel increased in the varying-V-content, low-Si hyper-eutectoid steels (symbol "○"). Specifically, as the V content increased from V-free (Steel 21) to 0.028% (Steel 22), 0.058% (Steel 23), and 0.097% (Steel 24), the \Tickers hardness increased. However, the Vickers hardness stayed around 350 HV and the wear amount decreased only to about 0.015 g/10000 rev. On the other hand, in the varying-V-content, high-Si hyper-eutectoid steels (symbol "Δ"), as the V content increased from V-free (Steel 25) to 0.028% (Steel 26), 0.058% (Steel 27), and 0.096% (Steel 28), the Vickers hardness of wheel increased to about 380 HV. However, even though the Vickers hardness increased, the wear amount of wheel stayed constant at about 0.015 g/10000 rev. and there was no further decrease.

In contrast to this, in the V-free hyper-eutectoid steels (symbol "◇"), as the C content increased from 0.84% (Steel 1) to 0.93% (Steel 2), 1.00% (Steel 3), and 1.09% (Steel 4), the Vickers hardness increased. Further, as the Vickers hardness increased, the wear amount decreased to about 0.010 g/10000 rev.

As a result described above, in a steel for railway wheel, wear resistance as used as a railway wheel is improved better when hardness is increased by increasing the C content more than when hardness is increased by increasing the V content even if the same hardness is obtained. Though this reason is not clear, the following matters are considered. The tread of the railway wheel being used is subjected to external force (load) from the rail. By this external force, the cementite in the pearlite in the outer layer immediately below the tread is crushed, and the hardness is further increased by dispersion strengthening. Further, carbon in crushed fine cementite dissolves supersaturatedly into ferrite in the pearlite, thereby increasing the hardness of the outer layer immediately below the tread by solid-solution strengthening.

Increasing the C content in steel will result in increase in the volume fraction of cementite in pearlite. Moreover, the pearlite is more likely to form finer lamella. In this case, the wear resistance of a railway wheel will be improved by the above described mechanism. In contrast to this, when V is contained in steel, the hardness of steel is increased by precipitation hardening of V carbonitride. In this occasion, since V carbonitride is formed in ferrite, it increases mostly the hardness of ferrite. That is, containment of V does not significantly affect refinement of pearlite. For that reason, although wear resistance can be improved to some extent by V containment, it cannot be improved as high as by dispersion strengthening by crushed cementite and solid-solution strengthening of C.

Therefore, even if the same hardness is obtained in a railway wheel steel, it is possible to improve wear resistance more by increasing the C content than by containing V.

Based on the results of investigation described so far, the present inventors contemplated that, in the chemical composition of railway wheel, a hyper-eutectoid steel consisting of, in mass %, C: 0.80 to 1.15%, Si: 1.00% or less, Mn: 0.10 to 1.25%, P: 0.050% or less, S: 0.030% or less, Al: 0.025 to 0.650%, N: 0.0030 to 0.0200%, Cr: 0 to 0.60%, and V: 0 to 0.12%, with the balance being Fe and impurities is preferable to improve wear resistance.

[Suppression of Formation of Pro-Eutectoid Cementite]

As described so far, a railway wheel is produced by subjecting an intermediate product of railway wheel to heat treatment (tread quenching). Wear resistance is required for the tread and the flange, which can be brought into contact with a rail, in a railway wheel. Therefore, in the heat treatment for the intermediate product in a conventional production process of a railway wheel, cooling medium (water, or mixed fluid of water and air) is sprayed onto the tread and the flange of the rim part of the intermediate product of the railway wheel to rapidly cool the tread and the flange to form a tine pearlite structure in an outer layer immediately below the tread and in an outer layer of the flange. On the other hand, in a conventional heat treatment, the surface of a railway wheel other than the tread and the flange surface (the surface of the hub part, the surface of the web part, and the side face of the rim part) are allowed to cool without being sprayed with a cooling medium. This is because, as described above, wear resistance is required for the tread and the flange surface of the rim part, and wear resistance is not required for the surface other than tread and the flange surface of a railway wheel (the surfaces of the hub part and the web part, and the side face of the rim part).

In a case of a hypo-eutectoid steel and an eutectoid steel in which the C content is low as in a conventional railway wheel, pro-eutectoid cementite is not likely to be formed. However, in a case of a hyper-eutectoid steel in which the C content is 0.80% or more as in the above described chemical composition, the investigation by the present inventors have revealed for the first time that if a railway wheel is produced by a conventional production method, pro-eutectoid cementite may be formed within the railway wheel, and especially pro-eutectoid cementite is likely to be formed in the hub part and the web part, which were conventionally allowed to cool in tread quenching. The pro-eutectoid cementite deteriorates toughness. Therefore, in a railway wheel made of a hyper-eutectoid steel in which the C content is 0.80% or more, it is preferable to suppress formation of pro-eutectoid cementite not only in the rim part but also in the hub part and the web part.

Further, the quenched layer which is formed in the outer layer of an intermediate product of a railway wheel at the time of heat treatment also deteriorates toughness of the railway wheel when it is remained as is in the railway wheel without being removed by cutting. For that reason, in the other surface other than the tread and the flange surface on which the quenched layer is removed by cutting (surfaces of the hub part and the web part, and side face of the rim part), it is preferable that formation of pro-eutectoid cementite is suppressed, and on top of that, formation of quenched layer can be suppressed as well.

Accordingly, the present inventors have made studies and investigations on a method of suppressing pro-eutectoid cementite not only in the rim part including the tread and the flange, but also in the web part and the hub part in the production process of a railway wheel. As a result, the present inventors have obtained the following findings.

Figure 4:
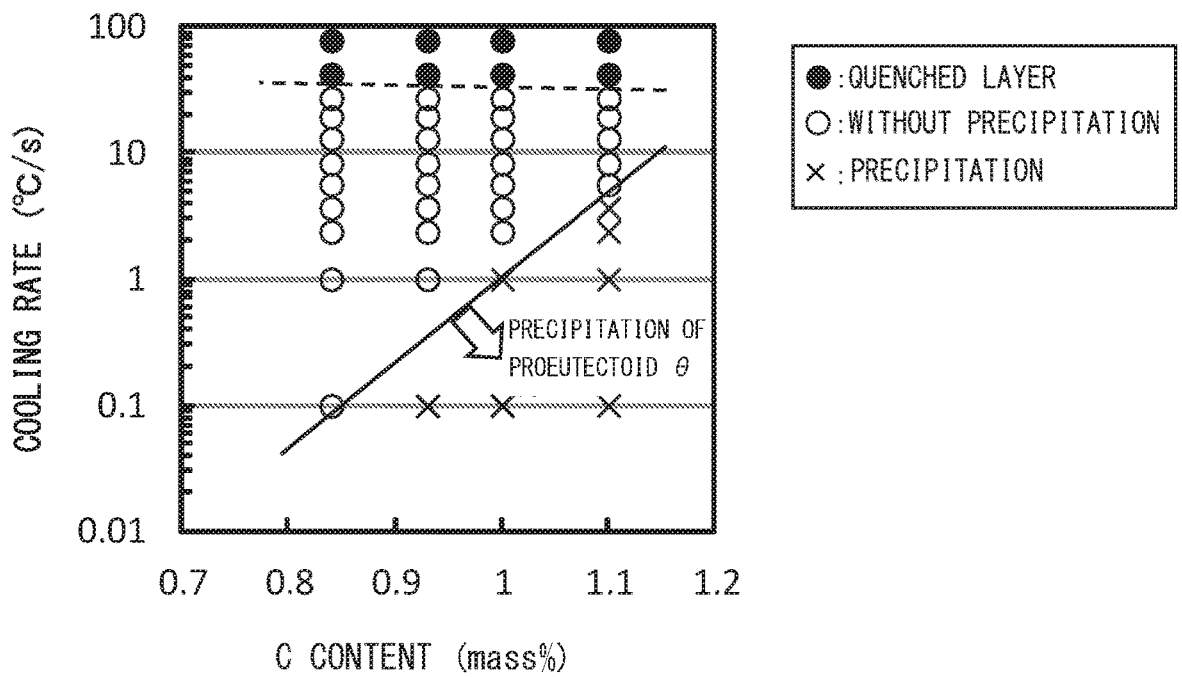
FIG. 4 is a diagram illustrating relationships among the C content, the cooling rate, and the quenched layer and pro-eutectoid cementite based on results of a heat treatment test simulating a heat treatment during the production process of a railway wheel.
Figure 6:
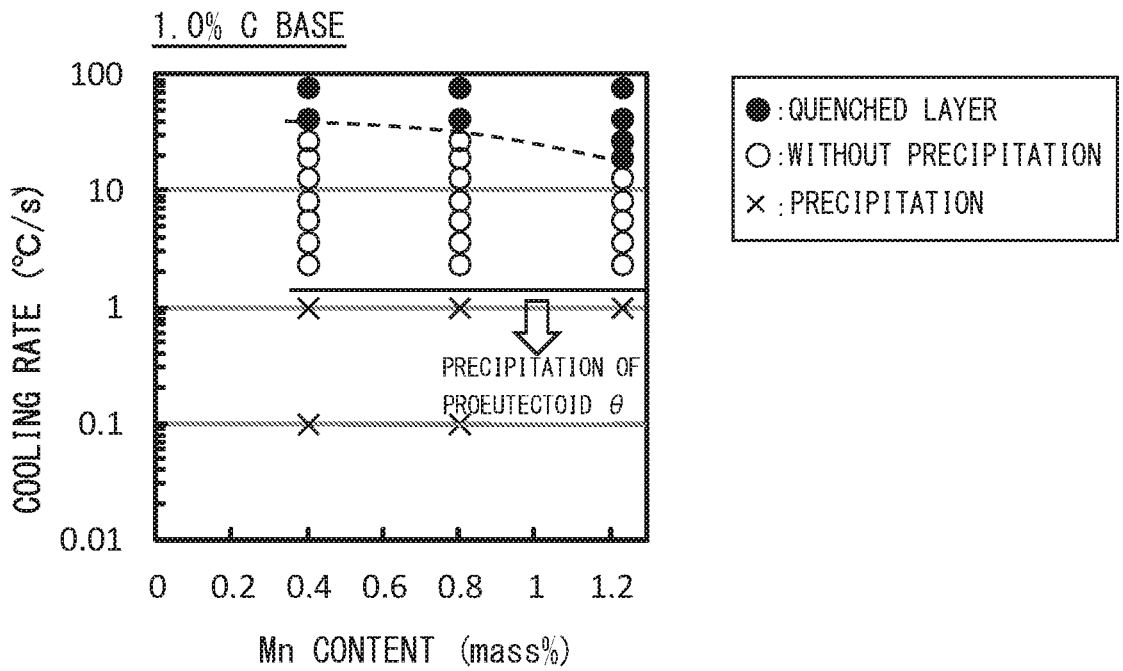
FIG. 6 is a diagram illustrating relationships among the Mn content, the cooling rate, and the quenched layer and pro-eutectoid cementite based on results of a heat treatment test assuming a heat treatment during the production process of a railway wheel.
Figure 7:
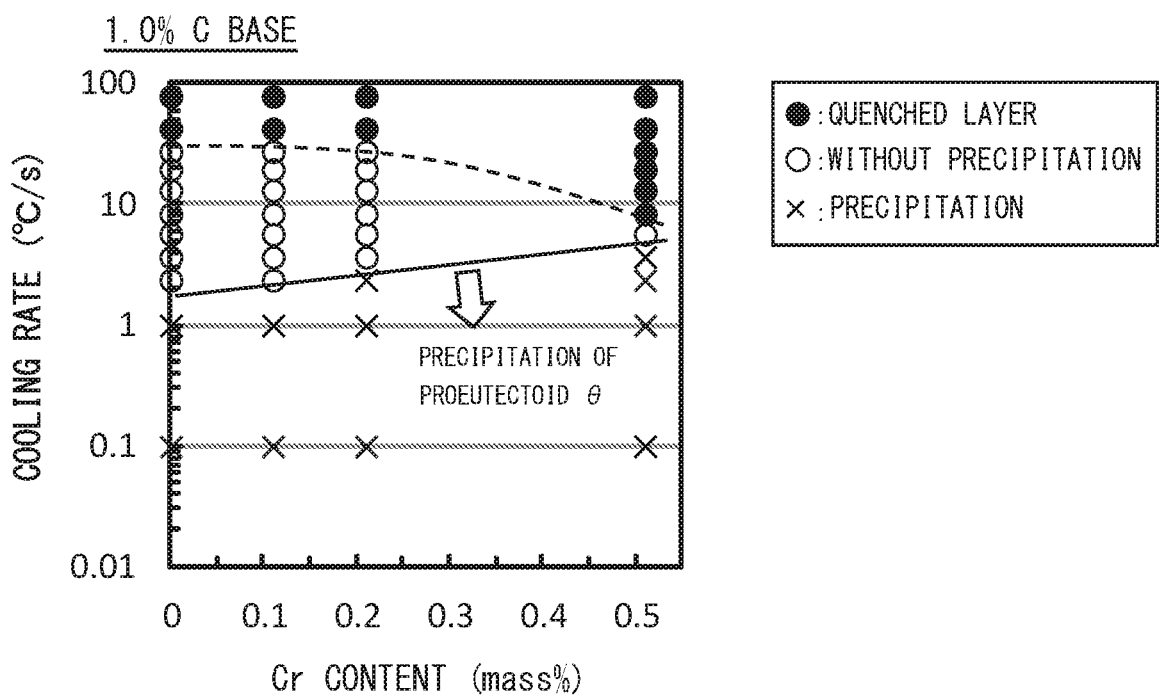
FIG. 7 is a diagram illustrating relationships among the Cr content, the cooling rate, and the quenched layer and pro-eutectoid cementite based on results of a heat treatment test assuming a heat treatment during the production process of a railway wheel.
Figure 8:
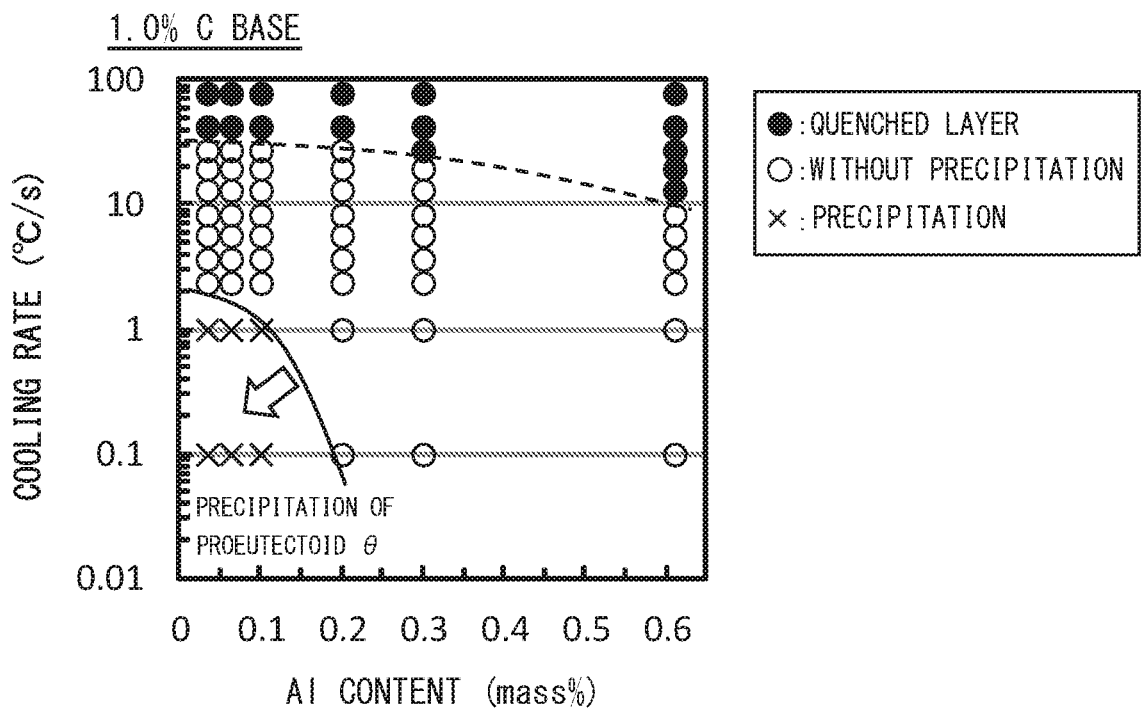
FIG. 8 is a diagram illustrating relationships among the Al content, the cooling rate, and the quenched layer and pro-eutectoid cementite based on results of a heat treatment test assuming a heat treatment during the production process of a railway wheel.

FIGS. 4 to 9 are diagrams each illustrating relationships among the content of each element in steel (FIG. 4: C content, FIG. 5: Si content, FIG. 6: Mn content, FIG. 7: Cr content. FIG. 8: Al content, and FIG. 9: V content) based on results of a heat treatment test simulating a heat treatment during the production process of a railway wheel, the average cooling rate (° C./sec) in a range from 800 to 500° C., and the quenched layer and pro-eutectoid cementite.

Figure 5:
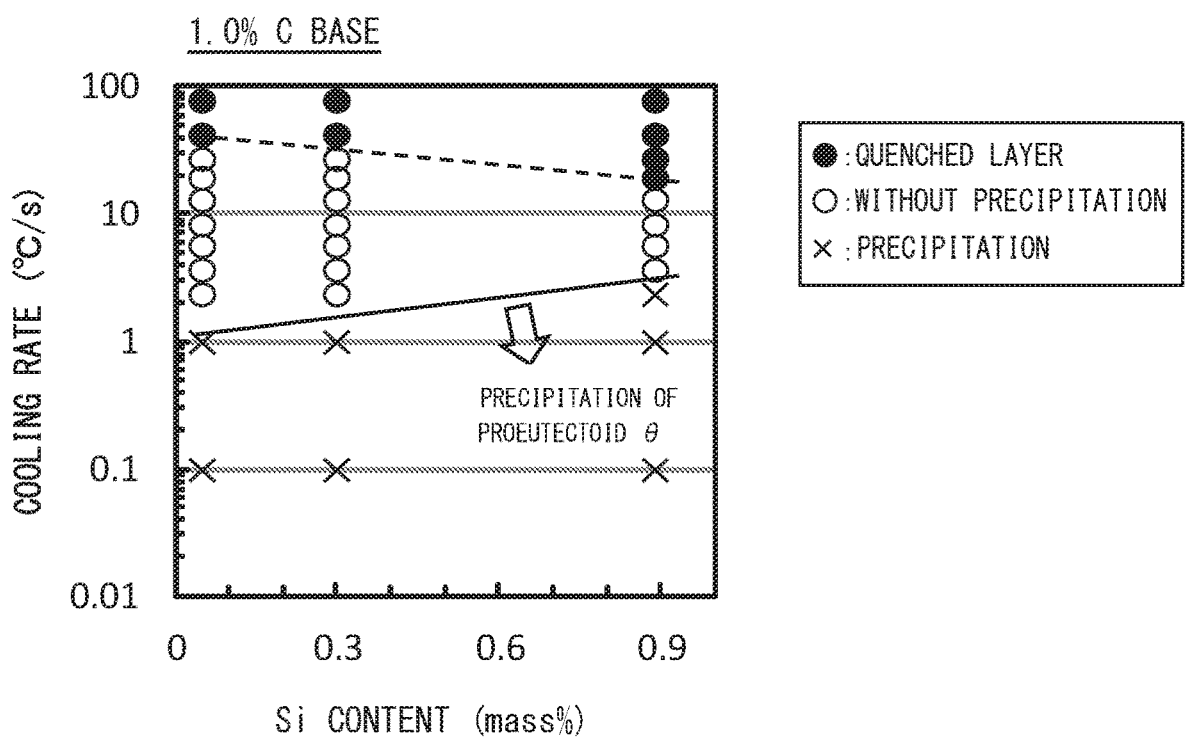
FIG. 5 is a diagram illustrating relationships among the Si content, the cooling rate, and the quenched layer and pro-eutectoid cementite based on results of a heat treatment test simulating a heat treatment during the production process of a railway wheel.

FIG. 4 is created based on results obtained by a Jominy end-quench test to be described below by using a plurality of samples (Steel Nos. 1, 2, 3, 4 in Table 3 to be described below) in which the C content is varied. FIG. 5 is created based on results obtained by the Jominy end-quench test by using a plurality of samples (Steel Nos. 5, 3, 6 in Table 3 to be described below) in which the Si content is varied. FIG. 6 is created based on results obtained by the Jominy end-quench test by using a plurality of samples (Steel Nos. 7, 3, 8 in Table 3 to be described below) in which the Mn content is varied. FIG. 7 is created based on results obtained by the Jominy end-quench test by using a plurality of samples (Steel Nos. 3, 9, 10, 11 in Table 3 to be described below) in which the Cr content is varied. FIG. 8 is created based on results obtained by the Jominy end-quench test by using a plurality of samples (Steel Nos. 3, 12, 13, 14, 15, 16 in Table 3 to be described below) in which the Al content is varied.

Figure 9:
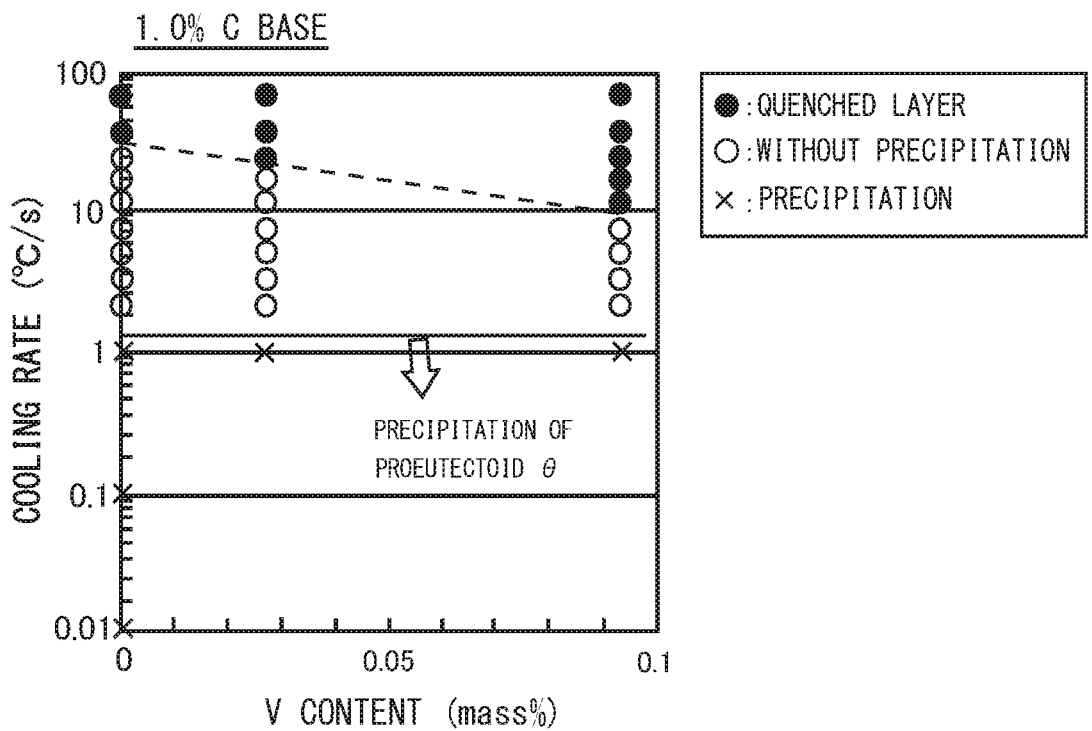
FIG. 9 is a diagram illustrating relationships among the V content, the cooling rate, and the quenched layer and pro-eutectoid cementite based on results of a heat treatment test assuming a heat treatment during the production process of a railway wheel.

FIG. 9 is created based on results obtained by the Jominy end-quench test by using a plurality of samples (Steel Nos. 3, 17, 18 in Table 3 to be described below) in which the V content is varied.

The symbol "●" in FIGS. 4 to 9 indicates that a quenched layer (martensite and/or bainite) has been formed. The symbol "○" indicates that no quenched layer is formed, the microstructure is substantially composed of pearlite, the amount of pro-eutectoid cementite in the microstructure is not more than 1.0 pieces/100 μm, and substantially no pro-eutectoid cementite is present. The symbol "X" indicates that no quenched layer is formed in the microstructure, the microstructure is substantially composed of pearlite, the amount of pro-eutectoid cementite is more than 1.0 pieces/100 μm, and pro-eutectoid cementite is formed in the microstructure. Where, the phrase "the microstructure is substantially composed of pearlite" means that the area fraction of pearlite in the microstructure is 95% or more. Moreover, the measurement method of the amount of pro-eutectoid cementite (pieces/100 μm) will be described later.

Referring to FIG. 4, it is confirmed that when the cooling rate is too fast, a quenthed layer is formed. Here, in the present description, a maximum cooling rate at which pearlite is formed in the structure, and no quenched layer will be formed (the cooling rate at the boundary between the symbols "●" and "○" in FIG. 4) is defined as a pearlite critical cooling rate. In FIGS. 4 to 9, the pearlite critical cooling rate is shown by a dotted line. Referring to FIG. 4, as the C content increases, the pearlite critical cooling rate is decreased. Referring to FIG. 5, as the Si content increases, the pearlite critical cooling rate is decreased. Referring to FIG. 6, as the Mn content increases, the pearlite critical cooling rate is decreased. Referring to FIG. 7, as the Cr content increases, the pearlite critical cooling rate is decreased. Referring to FIG. 8, as the Al content increases, the pearlite critical cooling rate is decreased. Referring to FIG. 9, as the V content increases, the pearlite critical cooling rate is decreased. That is, referring to FIGS. 4 to 9, all of C, Si, Mn, Cr, Al, and V have the effect of decreasing the pearlite critical cooling rate.

On the other hand, when the cooling rate is too slow, pro-eutectoid cementite may be formed in the structure. Referring to FIG. 4, if the C content increases, pro-eutectoid cementite is formed even if the cooling rate is fast.

Here, a maximum cooling rate at which pro-eutectoid cementite is formed in an amount of more than 1.0 pieces/100 μm (a cooling rate at the boundary between the symbols "○" and "X" in the figure) is defined as a pro-eutectoid cementite critical cooling rate. The pro-eutectoid cementite critical cooling rate is shown by a solid line in FIGS. 4 to 9.

In FIG. 4, as the C content increases, the pro-eutectoid cementite critical cooling rate increases. Similarly, in FIG. 5, although not remarkable as in C, as the Si content increases, the pro-eutectoid cementite critical cooling rate increases. In FIG. 7, although not so remarkable as in C as well, as the Cr content increases, the pro-eutectoid cementite critical cooling rate increases. Further, referring to FIGS. 6 and 9, even if the Mn content or the V content increases, the pro-eutectoid cementite critical cooling rate does not change so much. On the other hand, referring to FIG. 8, if the Al content increases, the pro-eutectoid cementite critical cooling rate remarkably decreases.

Therefore, regarding the pro-eutectoid cementite critical cooling rate, C has the effect of increasing the pro-eutectoid cementite critical cooling rate, and Al has the effect of decreasing the pro-eutectoid cementite critical cooling rate.

Based on the results described so far, the present inventors have further investigated on the relationships among the pearlite critical cooling rate and the pro-eutectoid cementite critical cooling rate, and the C content, Si content, Mn content, Cr content, Al content and V content. As a result, they have found that when a railway wheel made of a hyper-eutectoid steel having the above described chemical composition is produced, in the cooling of an intermediate product of the railway wheel after heat treatment at a temperature of not less than the $A_{cm}$ transformation point during the production process, if the cooling rate (° C./sec) a range of 800 to 500° C. is not more than Fn1 which is an index of the pearlite critical cooling rate and defined by Formula (I), the formation of a quenched layer can be suppressed. They have also found that if the cooling rate is not less than Fn2 which is an index of the pro-eutectoid cementite critical cooling rate and defined by Formula (2), the formation of pro-eutectoid cementite can be suppressed:

$Fn1=-5.0+\exp(5.651-1.427\times C-1.280\times Si-0.7723\times Mn-1.815\times Cr-1.519\times Al-7.798\times V)$      (1)

$Fn2=0.515+\exp(-24.816+24.121\times C+1.210\times Si+0.529\times Mn+2.458\times Cr-15.116\times Al-5.116\times V)$      (2)

where, each symbol of element in Formulae (1) and (2) is substituted by the content (mass %) of the corresponding element. Note that 800 to 500° C. is a temperature range in which pearlite and pro-eutectoid cementite are formed.

The method for producing a railway wheel according to the present embodiment, which has been completed based on the findings described so far, includes a heating step and a cooling step. In the heating step, an intermediate product of the railway wheel which has a chemical composition consisting of, in mass %, C: 0.80 to 1.15%, Si: 1.00% or less, Mn: 0.10 to 1.25%, P: 0.050% or less, S: 0.030% or less, Al: 0.025 to 0.650%, N: 0.0030 to 0.0200%, Cr: 0 to 0.60%, and V: 0 to 0.12%, with the balance being Fe and impurities, and includes a hub part, a rim part having a tread and a flange, and a web part disposed between the hub part and the rim part is heated to not less than the $A_{cm}$ transformation point. In the cooling step, the intermediate product is cooled. In the cooling step, the intermediate product is cooled such that: the cooling rate in a range from 800 to 500° C. at the surface of the intermediate product of the railway wheel other than the tread and the flange surface is not more than Fill ° C./sec which is defined by Formula (1); the cooling rate in a range from 800 to 500° C. in a region in which the cooling rate is slowest in the intermediate product of the railway wheel is not less than Fn2° C./sec which is defined by Formula (21); and the cooling rate in a range from 800 to 500° C. at the tread and the flange surface of the intermediate product of the railway wheel is not less than Fn2° C./sec:

$Fn1=-5.0+\exp(5.651-1.427\times C-1.280\times Si-0.7723\times Mn-1.815\times Cr-1.519\times Al-7.798\times V)$      (1)

$Fn2=0.515+\exp(-24.816+24.121\times C+1.210\times Si+0.529\times Mn+2.458\times Cr-15.116\times Al-5.116\times V)$      (2)

where, each symbol of element in Formulae (1) and (2) substituted by the content (mass %) of the corresponding element.

Further in the above described cooling step, the intermediate product may be cooled such that the cooling rate in a range from 800 to 500° C. at the tread and the flange surface is not less than Fn2° C./sec and not less than 5° C./sec, and not more than 200° C./sec.

The chemical composition of the intermediate product of the above described railway wheel may contain one or more elements selected from the group consisting of Cr: 0.02 to 0.60% and V: 0.02 to 0.12%.

A railway wheel according to the present embodiment has a chemical composition consisting of, in mass %, C: 0.80 to 1.15%, Si: 1.00% or less, Mn: 0.10 to 1.25%, P: 0.050% or less, S: 0.030% or less, Al: 0.025 to 0.650%, N: 0.0030 to 0.0200%, Cr: 0 to 0.60%, and V: 0 to 0.12%, with the balance being Fe and impurities, and includes a hub part, a rim part having a tread and a flange, and a web part disposed between the hub part and the rim part. In the microstructure of the hub part, the area fraction of pearlite is 95% or more, and the amount of pro-eutectoid cementite defined by Formula (A) is not more than 1.0 pieces/100 µm. In the microstructure of the web part, the area fraction of pearlite is 95% or more, and the amount of pro-eutectoid cementite defined by Formula (A) is not more than 1.0 pieces/100 µm. In the microstructure of the rim part, the area fraction of pearlite is 95% or more, and the amount of pro-eutectoid cementite defined by Formula (A) is not more than 1.0 pieces/100 µm.

Amount of pro-eutectoid cementite (pieces/100 µm)=a total sum of the number of pieces of pro-eutectoid cementite which intersect with two diagonal lines in a square visual field of 200 µm×200 µm/(5.66×100 µm)      (A)

The chemical composition of the intermediate product may contain one or more elements selected from the group consisting of Cr: 0.02 to 0.60% and V: 0.02 to 0.12%.

Hereinafter, the method for producing a railway wheel and a railway wheel according to the present embodiment will be described in detail. The symbol "%" regarding elements means, unless otherwise stated, mass %.

[Chemical Composition of Railway Heel]

The railway wheel of the present embodiment has a shape including a hub part 2, a web part 3, and a rim part 4 including a tread 41 and a flange 42 as shown in FIG. 1. The chemical composition of a railway wheel of the present embodiment contains the following elements.

C: 0.80 to 1.15%

Carbon (C) increases the hardness of steel and increases the wear resistance. If the C content is too low, these effects cannot be obtained. On the other hand, if the C content is too high, pro-eutectoid cementite precipitates at prior-austenite grain boundaries, and the ductility, the toughness, and the fatigue life of steel deteriorates. Therefore, the C content is 0.80 to 1.15%. The lower limit of the C content is preferably 0.85%, more preferably 0.86%, still more preferably 0.87%, and still more preferably 0.90%. The upper limit of the C content is preferably 1.05%, more preferably 1.00%.

Si: 1.00% or Less

Silicon (Si) is inevitably contained. That is, the Si content is more than 0%. Si solid-solution strengthens ferrite, thereby increasing the hardness of steel. However, if the Si content is too high, pro-eutectoid cementite becomes likely to be formed. Also, if the Si content is too high, the hardenability of steel becomes too high, and martensite becomes likely to be formed. Further, quenching may be caused by friction heat generated between the wheel and the brake pad while being used as the railway wheel, thus deteriorating crack resistance of steel. Therefore, the Si content is not more than 1.00%. The upper limit of the Si content is preferably 0.80%, more preferably 0.65%, further preferably 0.45%, and further preferably 0.35%. The lower limit of the Si content is preferably 0.01%, more preferably 0.05%, and further preferably 0.20%.

Mn: 0.10 to 1.25%

Manganese (Mn) solid-solution strengthens ferrite to increase the hardness of steel. Mn further forms MnS to improve the machinability of steel. If the Mn content is too low, these effects cannot be obtained. On the other hand, if the Mn content is too high, the hardenability of steel becomes too high, and martensite becomes likely to be formed. Moreover, quenching is caused by friction heat generated between the wheel and the brake pad during use as the railway wheel, and crack resistance of steel may deteriorate. Therefore, the Mn content is 0.10 to 1.25%. The lower limit of the Mn content is preferably 0.50%, more preferably 0.60%, and still more preferably 0.70%. The upper limit of the Mn content is preferably 1.00%, and more preferably 0.82%.

P: 0.050% or Less

Phosphorus (P) is an inevitably contained impurity. That is, the P content is more than 0%. P segregates at grain boundaries to deteriorate the toughness of steel. Therefore, the P content is 0.050% or less. The upper limit of the P content is preferably 0.030%, and more preferably 0.020%. The P content is preferably as low as possible. However, excessively reducing the P content will result in excessive increase in the refining cost. Therefore, in consideration of ordinary industrial manufacturing, the lower limit of the P content is preferably 0.0001%, and more preferably 0.0005%.

S: 0.030% or Less

Sulfur (S) is unavoidably contained. That is, the S content is more than 0%. When S is actively contained, S forms MnS, thereby improving the machinability of steel. However. S deteriorates the toughness of steel. Therefore, the S content is 0.030% or less. The upper limit of the S content is preferably 0.020%. The lower limit of the S content for obtaining the effects of the improved machinability is preferably 0.001%, and more preferably 0.005%.

Al: 0.025 to 0.650%

Aluminum (Al) suppresses formation of pro-eutectoid cementite in the chemical composition, in which the C content is 0.80% or more, of a railway wheel of the present embodiment, thereby improving the toughness of steel. Further Al combines with N to form AlN, and refines the crystal grain. As a result of refining of the crystal grain, the toughness of steel is improved. These effects cannot be obtained if the Al content is too low. On the other hand, if the Al content is too high, coarse non-metallic inclusions increase, thus deteriorating the toughness of steel. Therefore, the Al content is 0.025 to 0.650%. The lower limit of the Al content is preferably 0.030%, more preferably 0.040%, and still more preferably 0.050%. The upper limit of the Al content is preferably 0.450%, more preferably 0.350%, still more preferably 0.250%, and still more preferably 0.115%. The Al content as used herein means the content of acid-soluble Al (sol. Al).

N: 0.0030 to 0.0200%

Nitrogen (N) combines with Al to form AlN and refines crystal grains. As crystal grains are refined, the toughness of steel is improved. If the N content is too low, this effect cannot be obtained. On the other hand, if the N content is too high, such effect is saturated. Therefore, the N content is 0.0030 to 0.0200%. The lower limit of the N content is preferably 0.0035%, and more preferably 0.0040%. The upper limit of the N content is preferably 0.0100%, and more preferably 0.0080%.

The balance of the chemical composition of the railway wheel according to the present embodiment consists of Fe and impurities. Where, an impurity means an element, which is introduced from ores and scraps as the raw material, or from a production environment, etc. when the above described railway wheel is industrially produced, and which is permitted within a range not adversely affecting the railway wheel of the present embodiment.

The chemical composition of the railway wheel according to the present embodiment may also contain one or more elements selected from the group consisting of Cr and V in place of part of Fe.

Cr: 0 to 0.60%

Chromium (Cr) is an optional element and may not be contained. That is, the Cr content may be 0%. When contained, Cr decreases the lamellar spacing of pearlite, thereby significantly increasing the hardness of pearlite. However, if the Cr content is too high, pro-eutectoid cementite is more likely to be formed. Further, if the Cr content is too high, the hardenability improves and martensite is more likely to be formed. Therefore, the Cr content is 0 to 0.60%. The upper limit of the Cr content is preferably 0.30%, preferably 0.25%, and more preferably 0.10%. The preferable lower limit of the Cr content to obtain the effect of reducing the lamellar spacing of pearlite is 0.02%.

V: 0 to 0.12%

Vanadium (V) is an optional element and may not be contained. That is, the V content may be 0%. When contained, V forms any of carbide, nitride and carbonitride, thereby precipitation strengthening steel. As a result, the hardness of railway wheel is significantly increased to further enhance wear resistance. However, if the V content is too high, the hardenability becomes high, and the thickness of the quenched layer after tread quenching increases excessively. Therefore, the V content is 0 to 0.12%. The upper limit of the V content is preferably 0.09%. The lower limit of the V content is preferably 0.02%, and more preferably 0.03%.

[Production Method of Railway Wheel]

One example of the production method of railway wheel described above will be described. The method for producing a railway wheel according to the present embodiment includes a heat treatment process. The heat treatment process includes a heating step and a cooling step.

[Heating Step]

In the heating step, firstly, an intermediate product which has the above described chemical composition and has a rough shape of a railway wheel including a hub part, a web part and a rim part is prepared. The intermediate product is produced, for example, in the following way.

Molten steels having the above described chemical composition are produced by using an electric furnace or a converter. Starting materials are produced by using the molten steels. For example, a cast piece is produced by, for example, a continuous casting method. Alternatively, an ingot is produced by an ingot making process. The cast piece or the ingot are subjected to blooming or hot forging to produce a billet as the starting material. The starting material may be a cast piece produced by a continuous casting process. The shape of the starting material is preferably cylindrical.

Using the prepared starting material, the above described intermediate product is formed. The starting material is cut in a direction perpendicular to the longitudinal direction. The cut starting material is subjected to hot working in a direction perpendicular to the cut surface to form a disc shape. By further being subjected to hot working, the intermediate product of railway wheel is formed so as to have a rough shape of the wheel. In the hot working, for example, hot forging is performed, and thereafter hot rolling (wheel rolling) is performed as needed. By the process described so far, the intermediate product is produced.

The produced intermediate product is heated. Specifically, the intermediate product is heated to not less than the $A_{cm}$ transformation point (° C.). For example, the intermediate product is loaded into a heating furnace to be heated at a temperature (quenching temperature) not less than the $A_{cm}$ transformation point. The heating rate and the holding time at the quenching temperature may be selected from well-known conditions. Though the $A_{cm}$ transformation point varies depending on the chemical composition of steel, the quenching temperature is, for example, 850 to 1000° C.

[Cooling Step]

The heated intermediate product is subjected to a cooling step. By this cooling step, the microstructures of the outer layer immediately below the tread and the outer layer of the flange in the intermediate product of a railway wheel are transformed into fine pearlite structure having high wear resistance. In the outer layer immediately below the tread and the outer layer of the flange, a certain amount of quenched layer (a layer composed of martensite and/or bainite) may be formed in the layer above fine pearlite. In this case, the quenched layer is removed by cutting in the subsequent step. On the other hand, formation of quenched layer in the microstructure is suppressed in the surface other than the tread and the flange surface of the intermediate product. Then, the microstructure is made substantially composed of pearlite structure (the area fraction of pearlite is 95% or more). Here, the surface other than the tread and the flange surface of the intermediate product means the surface of the web part, the surface of the hub part, and the surface of the rim part other than the tread and the flange surface. The reason to suppress the formation of a quenched layer in the surface other than the tread and the flange surface of the intermediate product is that it is difficult to cut the formed quenched layer in the surface other than the tread and the flange surface of the intermediate product.

Further, formation of pro-eutectoid cementite is suppressed in any region of the intermediate product. That is, in the intermediate product of the railway wheel having the above described chemical composition which is a hyper-eutectoid steel, formation of pro-eutectoid cementite is suppressed not only in the rim part but also in the web part and the hub part. By suppressing formation of quenched layer and also suppressing formation of pro-eutectoid cementite in all of the microstructures of the rim part other than the tread and the flange, the plate part, and the hub part, it is possible to suppress deterioration of toughness even for a railway wheel having the above described chemical composition which is a hyper-eutectoid steel.

Specifically, the intermediate product at the above described quenching temperature is cooled in such a way to satisfy all of the following (A) to (C).

(A) The intermediate product is cooled such that the cooling rate in a range from 800 to 500° C. at the surface of the intermediate product other than the tread and the flange surface, that is, the surface of the hub part, the surface of the web part, and the side face of the rim part (the surface of the rim part other than the tread and the flange surface) is not more than Fn1° C./sec.

(B) The intermediate product is cooled such that the cooling rate in a region where the cooling rate in a range from 800 to 500° C. is slowest in the intermediate product, that is, a region where the cooling rate is slowest in the interior of the hub part, the interior of the web part, and the interior of the rim part (hereinafter, referred to as a slowest region) is not less than Fn2° C./sec.

(C) The intermediate product is cooled such that the cooling rate in a range from 800 to 500° C. at the tread and the flange surface in the intermediate product is not less than Fn2° C./sec.

If the cooling rate is less than Fn2° C./sec at the tread and the flange surface, pro-eutectoid cementite will precipitate in the tread and in a portion near the flange surface in the rim part. Therefore, the cooling rate is set to not less than Fn2° C./sec at the tread and the flange surface.

Note that the upper limit of the cooling rate at the tread and the flange surface will not be particularly limited. However, if the cooling rate at the tread and the flange surface is too fast, the thickness of quenched layer which will be formed increases, and a range to be removed in the cutting step increases. Therefore, the upper limit of the cooling rate at the tread and the flange surface is preferably 200° C./sec. Moreover, the cooling rate at the tread and the flange surface is preferably not less than Fn2° C./sec and not less than 5° C./sec. In this case, the pearlite structures in the outer layer immediately below the tread and the outer layer of the flange are further refined, and further excellent wear resistance can be obtained.

Here, the reason why the "cooling rate in a range from 800 to 500° C." is specified is that this temperature range is a temperature range in which pearlite transformation occurs, and also a temperature range in which pro-eutectoid cementite is formed. The phrase a "cooling rate in a range from 800 to 500° C." means an average cooling rate (° C./sec) in a range from 800 to 500° C. in each region of the intermediate product of a railway wheel.

The cooling rates at the surface and in the interior of the intermediate product will differ depending on the shape of the intermediate product (that is, railway wheel) and the cooling method. The temperature change of the surface (that is, cooling rate at each part) of the intermediate product during cooling can be identified by using a heat distribution measuring instrument represented by a thermographic device. Therefore, the cooling rate of the slowest region can be identified by the heat distribution measuring instrument as well.

Figure 10:
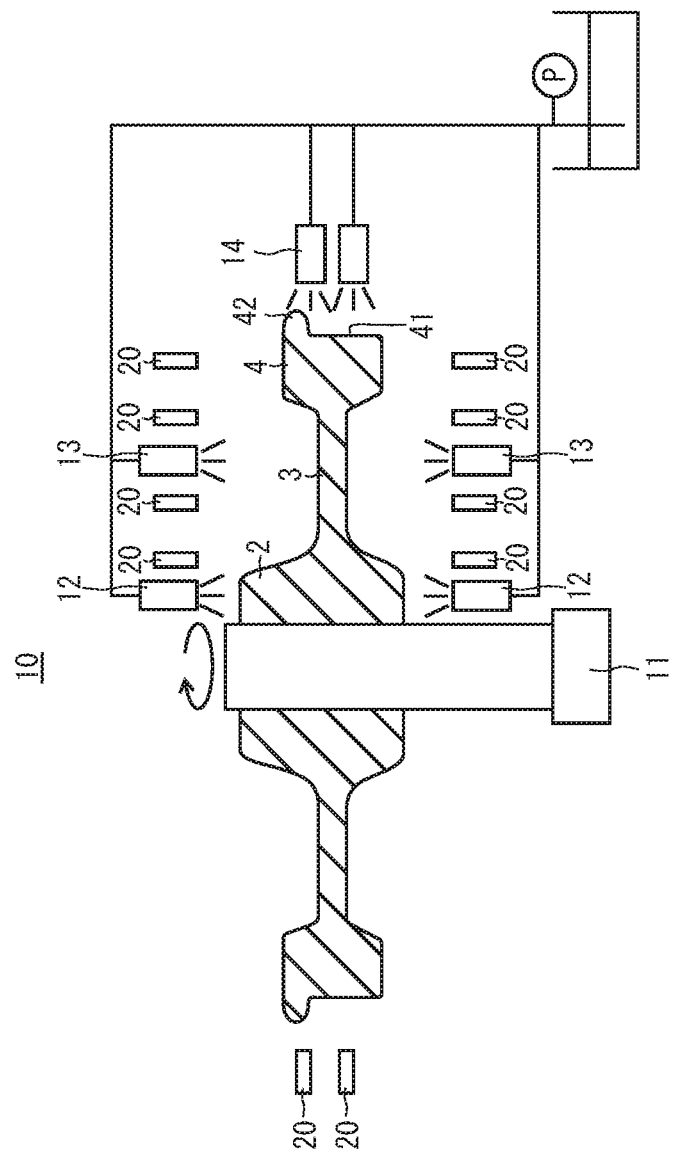
FIG. 10 is a schematic diagram illustrating an example of a cooling apparatus which is used in the method for producing a railway wheel according to the present embodiment.

For example, temperature changes of each area (region) of the intermediate product are identified by the following method. FIG. 10 is a side view of a cooling apparatus 10 to be used in the cooling step. Referring to FIG. 10, the cooling apparatus 10 includes a rotating apparatus 11 having a rotary shaft, and a plurality of cooling nozzles 12 to 14. The plurality of cooling nozzles 12 to 14 include one or more tread-cooling nozzles 14, one or more web part-cooling nozzles 13, and one or more hub part-cooling nozzles 12. The one or more tread-cooling nozzles 14 are disposed around the rotary shaft as conventionally. A nozzle port of the tread-cooling nozzle 14 is disposed so as to face the tread 41 of the intermediate product. The nozzle port of the tread-cooling nozzle 14 may be disposed so as to face the surface of the flange 42 of the intermediate product. The one or more web part-cooling nozzles 13 are disposed such that the nozzle port faces the surface of the web part 3. The one or more hub part-cooling nozzles 12 are disposed such that the nozzle port faces the surface of the hub part 2.

The tread-cooling nozzle 14 sprays cooling medium from the nozzle port to cool mainly the tread 41 and the surface of the flange 42 of the rim part 4. The web part-cooling nozzle 13 sprays cooling medium from the nozzle port to cool mainly the web part 3. The hub part-cooling nozzle 12 sprays cooling medium from the nozzle port to cool mainly the hub part 2. The tread-cooling nozzle 14 may cool not only the tread 41 and the surface of the flange 42 of the rim part 4, but also cool at least a part of the web part 3. The web part-cooling nozzle 13 may cool not only the web part 3, but also cool at least a part of the rim part 4 and/or at least a part of the hub part 2. The hub part-cooling nozzle 12 may cool not only the hub part 2, but also cool at least a part of the web part 3. The disposition and the numbers of the tread-cooling nozzles 14, web pan-cooling nozzles 13, and the hub pan-cooling nozzles 12 in FIG. 10 are examples, and will not be limited to these. The configuration of the plurality of cooling nozzles of the cooling apparatus will not be particularly limited provided that they can perform the cooling satisfying the above described (A) to (C) in the cooling step.

The above described cooling medium will not be particularly limited provided that a cooling rate suitable for a desired structure can be achieved. Examples of the cooling medium may include water, air, mist, steam (spray), and the like.

The cooling apparatus 10 further includes one or more thermographic devices (infrared heat distribution measuring instrument) 20. The thermographic devices 20 are disposed such that the upper surface temperature, lower surface temperature, side surface temperature of the intermediate product and the interior temperature of the intermediate product can be measured with the intermediate product of railway wheel being mounted to the cooling apparatus 10. The disposition and the number of the thermographic devices 20 in FIG. 10 are examples, and will not be limited thereto. In FIG. 10, the plurality of thermographic devices 20 are disposed such that temperature distribution of the tread 41, the surface of the flange 42, the surface of the rim part 4 other than the tread 41 and the surface of the flange 42 (for example, the side face of the rim part 4), the surface of the web part 3, and the surface of the hub part 2 can be measured.

For example, a sample intermediate product (a sample which is for the purpose of temperature measuring, and has the same shape and the same composition as the intermediate product of a railway wheel which provides a real product), which has been heated to not less than the $A_{cm}$ transformation point, is disposed in the cooling apparatus 10. The cooling medium is sprayed from the cooling nozzle 12 to 14 while the sample intermediate product is rotated by the rotating apparatus 11, thus starting cooling. During cooling, changes in temperature distribution of the sample intermediate product is measured by the plurality of thermographic devices 20.

The plurality of thermographic devices 20 are connected to a temperature distribution analyzer which is not shown. The temperature distribution analyzer includes, for example, a computer, and a temperature distribution analysis program stored in a memory in the computer. As a result of the temperature distribution analysis program being executed by a CPU, the temperature distribution analyzer three-dimensionally analyzes temperature change per unit time of each region (including the internal region of the sample intermediate product) of the sample intermediate product. The temperature distribution analyzer can perform analysis by a well-known method by using a well-known thermal conduction analysis program which utilizes a three dimensional FEM (finite element method).

The sample intermediate product is cooled (rapidly cooled) to the normal temperature to identify temperature changes of each region of the sample intermediate product. Then, based on the result of temperature changes, a region (slowest region) in which the cooling rate in a range from 800 to 500° C. in the sample intermediate product is slowest is identified.

The cooling rate of the sample intermediate product is adjusted by the cooling apparatus 10 such that: the cooling rate in a range from 800 to 500° C. at the surface other than the tread 41 and the surface of the flange 42, that is, the surface of the hub part 2, the surface of the web part 3, and the surface of the rim part 4 other than the tread 41 and the flange 42 in the region of the sample intermediate product measured by the thermographic device 20 is not more than Fn1° C./sec; the cooling rate in a range of 800 to 500° C. in the slowest region identified in the sample intermediate product by the three-dimensional analysis is not less than Fn2° C./sec; and the cooling rate in a range from 800 to 500° C. at the tread 41 and the surface of the flange 42 of the sample intermediate product measured by the thermographic device 20 is not less than Fn2° C./sec. Specifically, the cooling rates are adjusted by adjusting the flow rate of each cooling medium for the tread-cooling nozzle 14, the web part-cooling nozzle 13, and the hub part-cooling nozzle 12; and by selecting cooling nozzles to be used from the plurality of tread-cooling nozzles 14, the web part-cooling nozzles 13, and the hub part-cooling nozzles 12, which are disposed in the cooling apparatus 10. After the adjustment, cooling is performed on the intermediate product for a final product, which are heated to a temperature not less than the $A_{cm}$ transformation point, in place of the sample intermediate product, by using the cooling apparatus 10. Preferably, the cooling rate of the sample intermediate product is adjusted by the cooling apparatus 10 such that: the cooling rate in a range from 800 to 500° C. at the surface other than the tread 41 and the surface of the flange 42 is not more than Fn1° C./sec; the cooling rate in a range from 800 to 500° C. in the slowest region identified in the sample intermediate product by the three-dimensional analysis is not less than Fn2° C./sec; and the cooling rate in a range from 800 to 500° C. at the tread 41 and the surface of the flange 42 in the sample intermediate product measured by the thermographic device 20 is not less than Fn2° C./sec and not less than 5° C./sec, and not more than 200° C./sec.

In the cooling step, by making the cooling rate of the tread 41 and the surface of the flange 42 of the intermediate product not less than 5° C./sec, fine pearlite is formed in the near-surface portion immediately below the tread 41 and the near-surface portion of the flange 42. The C content of a railway wheel of the present embodiment is as high as 0.80 to 1.15%. For that reason, the wear resistance of fine pearlite is improved. Moreover, by cooling the intermediate product such that the cooling rates of the tread 41 and the surface of the flange 42 are not less than Fn2° C./sec, formation of pro-eutectoid cementite will be suppressed in the tread 41 and the surface of the flange 42 as well.

Moreover, the intermediate product is cooled such that the cooling rate is not more than Fn1° C./sec at the surface other than the tread 41 and the surface of the flange 42 (the surface of the hub part 2, the surface of the web part 3, and the surface of the rim part 4 other than the tread 41 and the surface of the flange 42). As a result, formation of quenched layer in the surface other than the tread 41 and the flange 42 is suppressed. Moreover, the intermediate product is cooled such that the cooling rate in the slowest region among the regions of the hub part 2, the plate part 3, and the rim part 4 is not less than Fn2° C./sec. As a result, formation of pro-eutectoid cementite will be suppressed. That is, in the above described cooling step, cooling is facilitated in portions other than the tread 41 and the flange 42 (the hub part 2, the web part 3, and the side face of the rim part 4) in addition to the tread 41 and the flange 42. By the steps described so far, the cooling step is performed. The temperature of the intermediate product after the cooling step will be, for example, normal temperature (25° C.). However, the temperature of the intermediate product after the cooling step will not be particularly limited, provided that it is not more than 500° C.

[Tempering Step]

The intermediate product after the cooling step is subjected to tempering as needed. The tempering may be performed at a well-known temperature and time. The tempering temperature is not more than the $A_{c1}$ transformation point. The tempering temperature is, for example, 400 to 600° C., and the holding time at the tempering temperature is, for example, 60 to 180 minutes. However, the tempering temperature and holding time will not be limited to these. The tempering may not be performed.

[Cutting Step]

Although fine pearlite is formed in the outer layer immediately below the tread 41 and the outer layer of the flange 42 of the intermediate product after the heat treatment process (heating step and cooling step), a quenched layer may be formed in the layer above the fine pearlite. In use for a railway wheel, the quenched layer has poor wear resistance. Therefore, in the present step, quenched layers in the outer layer immediately below the tread 41 and the outer layer of the flange 42 are removed by cutting. The cutting may be performed by a well-known method.

Note that in the production method of the present embodiment, a quenched layer is not likely to be formed at other surfaces other than the tread 41 and the surface of the flange 42 (the surface of the hub part 2, the surface of the web part 3, and the surface of the rim part 4 other than the tread 41 and the surface of the flange 42). For that reason, in the method for producing a railway wheel of the present embodiment, even though not only the rim part 4 of the intermediate product of railway wheel, but also the web part 3 and the hub part 2 are cooled, it is not necessary to cut the surfaces (the surface of the hub part 2, the surface of the web part 3, and the side face of the rim part 4) other than the tread 41 and the surface of the flange 42.

By the above described steps, a railway wheel of the present embodiment is produced. When a railway wheel is produced by the production method of the present embodiment, even though it is a railway wheel using a hyper-eutectoid steel, formation of pro-eutectoid cementite which causes deterioration of toughness is suppressed in the regions of the web part 3 and the hub part 2. Moreover, even though it is a railway wheel using a hyper-eutectoid steel, formation of a quenched layer which causes deterioration of toughness can be suppressed in the regions of the web part 3 and the hub part 2. Note that formation of pro-eutectoid cementite is suppressed in the rim part 4 as well.

[Structure of Railway Wheel]

The microstructure of a railway wheel produced by the above described production method is as follows. The structure of the outer layer immediately below the tread and the near-surface portion of the flange is a pearlite structure. The amount of pro-eutectoid cementite is not more than 1.0 pieces/100 μm. The microstructure of the hub part, the web part, and a portion of the rim part other than the tread and the flange is substantially composed of pearlite. That is, the area fraction of pearlite is 95% or more. Further, the amount of pro-eutectoid cementite is not more than 1.0 pieces/100 μm.

More specifically, in a railway wheel of a hyper eutectoid steel having the above described chemical composition, in the microstructure of the hub part, the area fraction of pearlite is 95% or more, and the amount of pro-eutectoid cementite is not more than 1.0 pieces/100 μm. And in the microstructure of the web part, the area fraction of pearlite is 95% or more, and the amount of pro-eutectoid cementite is not more than 1.0 pieces/100 μm. Also, in the microstructure of the rim part, the area fraction of pearlite is 95% or more, and the amount of pro-eutectoid cementite is not more than 1.0 pieces/100 μm. Where, the amount of pro-eutectoid cementite is defined by Formula (A).

$$\text{Amount of pro-eutectoid cementite (pieces/100 μm)} = \text{a total sum of the number of pieces of pro-eutectoid cementite which intersect with two diagonal lines in a square visual field of 200 μm} \times 200 \text{ μm}/(5.66 \times 100 \text{ μm}) \quad (A)$$

Here, the microstructure can be observed by the following method. A sample for microstructure observation is taken from each part (hub part, web part, and rim part) of a railway wheel in a position at a depth of more than 5 mm from the surface. The observation surface of each sample is mirror-finished by mechanical polishing. Thereafter, the observation surface is etched with a mixed solution of picric acid and sodium hydroxide. A photographic image is produced for any one visual field (200 μm×200 μm) in the observation surface after etching by using an optical microscope with a magnification of 500. Since, in the observation surface, pro-eutectoid cementite which is formed at a grain boundary of prior-austenite exhibits black color, it is identified whether or not pro-eutectoid cementite has been formed.

Figure 11:
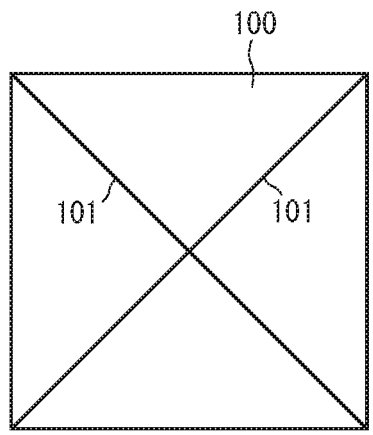
FIG. 11 is a schematic diagram for illustrating a measurement method of the amount of pro-eutectoid cementite.

As shown in FIG. 11, two diagonal lines 101 are drawn in a square visual field 100 of 200 μm×200 μm. Then, a total sum of the number of pieces of pro-eutectoid cementite that intersect with these two diagonal lines 101 is determined. As defined by Formula (1), the amount of pro-eutectoid cementite per 100 μm (pieces/100 μm) is determined by dividing the determined total number of pieces of pro-eutectoid cementite by a total length of the two diagonal lines 101 (5.66×100 μm).

If the amount of pro-eutectoid cementite is not more than 1.0 pieces/100 μm, the formation of pro-eutectoid cementite is sufficiently suppressed.

Next, the same observation surface is again mirror-finished by mechanical polishing and thereafter is etched by NITAL solution (mixed solution of nitric acid and ethanol). A photographic image is produced for any one visual field (200 μm×200 μm) in the observation surface after etching by using an optical microscope with a magnification of 500. Ferrite, bainite, martensite, and pearlite each have different contrasts. Therefore, based on the contrast, the quenched layer and pearlite in the observation surface are identified. The area fraction of pearlite is determined based on a total area of the identified pearlite and the area of the observation surface.

In a railway wheel produced by the above described production method, the microstructure of the rim part including the tread and the flange, in which the area fraction of pearlite is 95% or more, is substantially composed of pearlite. And the amount of pro-eutectoid cementite is not more than 1.0 pieces/100 μm. Therefore, the railway wheel is excellent in wear resistance. Further, the microstructures of the hub part, the web part, and the portion of the rim part other than the tread and the flange of the railway wheel are substantially composed of pearlite. Then, in the microstructures of the hub part, the web part, and the portion of the rim part other than the tread and the flange, the amount of pro-eutectoid cementite is not more than 1.0 pieces/100 μm respectively. Therefore, the railway wheel according to the present embodiment is excellent in toughness even if it has a chemical composition to become a hyper-eutectoid steel.

Note that immediately after the cooling step, as described above, the railway wheel may include a quenched layer in the outer layer immediately below the tread and the outer layer of the flange of the rim part. However, before the railway wheel is used, the quenched layer is removed by the above described cutting. As a result, the microstructures of the tread and the flange surface of the rim part are substantially composed of pearlite.

Example 1

Molten steels of Steel Nos. 1 to 18 having chemical compositions shown in Table 3 were produced.

A round ingot (a truncated cone shape having an upper face diameter of 107 mm, a bottom face diameter of 97 mm, and a height of 230 mm) was produced by an ingot-making process by using the above described molten steel. After being heated to 1250° C., the ingot was subjected to hot forging in a temperature range of 850 to 1100° C. to produce a round bar for railway wheel, which has a diameter of 40 mm.

[Jominy End-Quench Test]

A Jominy test specimen with a diameter of 25 mm and a length of 100 mm was made from a round bar with a diameter of 40 mm of each of Steel Nos. 1 to 18. Specifically, a round bar with a diameter of 40 mm was processed into a steel bar with a diameter of 25 mm by turning process. Thereafter, the round bar was cut off in a length of 100 mm to make a Jominy test specimen.

Simulating the heat treatment process (heating step and cooling step) in the production process of a railway wheel, the Jominy end-quench test conforming to HS G0561 (2011) was conducted by using the Jominy test specimen. Specifically, a Jominy test specimen was held in a furnace of 950° C., which is temperature not less than the $A_{cm}$ transformation point, in the atmosphere for 30 minutes so that the structure of the Jominy test specimen was turned into austenite single phase. Thereafter, end-quenching (water cooling) was performed. Specifically, water was sprayed to cool one end of the Jominy test specimen. After water cooling, a side face of

TABLE 3

| Steel No. | Chemical composition (unit is mass %, the balance being Fe and impurities) | | | | | | | | | Acm temperature (° C.) | Fn1 | Fn2 | Remarks |
|---|---|---|---|---|---|---|---|---|---|---|---|---|---|
| | C | Si | Mn | P | S | Al | N | Cr | V | | | | |
| 1 | 0.84 | 0.30 | 0.81 | 0.001 | 0.002 | 0.032 | 0.0038 | 0.00 | 0.00 | 768 | 24.8 | 0.5 | The invention |
| 2 | 0.93 | 0.29 | 0.80 | 0.001 | 0.002 | 0.032 | 0.0042 | 0.00 | 0.00 | 802 | 21.7 | 0.6 | The invention |
| 3 | 1.00 | 0.30 | 0.80 | 0.001 | 0.002 | 0.034 | 0.0040 | 0.00 | 0.00 | 828 | 18.8 | 1.2 | The invention |
| 4 | 1.09 | 0.30 | 0.79 | 0.001 | 0.002 | 0.036 | 0.0040 | 0.00 | 0.00 | 860 | 16.0 | 6.1 | The invention |
| 5 | 1.02 | 0.05 | 0.81 | 0.002 | 0.001 | 0.031 | 0.0042 | 0.00 | 0.00 | 829 | 26.8 | 1.3 | The invention |
| 6 | 1.03 | 0.89 | 0.80 | 0.001 | 0.002 | 0.036 | 0.0040 | 0.00 | 0.00 | 854 | 5.7 | 3.2 | The invention |
| 7 | 1.04 | 0.29 | 0.40 | 0.002 | 0.001 | 0.030 | 0.0056 | 0.00 | 0.00 | 842 | 26.2 | 2.0 | The invention |
| 8 | 1.02 | 0.31 | 1.23 | 0.002 | 0.001 | 0.030 | 0.0058 | 0.00 | 0.00 | 836 | 11.5 | 1.9 | The invention |
| 9 | 1.05 | 0.29 | 0.79 | 0.001 | 0.001 | 0.033 | 0.0030 | 0.11 | 0.00 | 853 | 13.6 | 3.4 | The invention |
| 10 | 1.03 | 0.29 | 0.78 | 0.001 | 0.001 | 0.034 | 0.0034 | 0.21 | 0.00 | 852 | 11.0 | 2.7 | The invention |
| 11 | 1.02 | 0.28 | 0.79 | 0.001 | 0.001 | 0.033 | 0.0036 | 0.51 | 0.00 | 868 | 4.5 | 4.2 | The invention |
| 12 | 1.03 | 0.29 | 0.79 | 0.001 | 0.001 | 0.063 | 0.0041 | 0.00 | 0.00 | 838 | 17.3 | 1.4 | The invention |
| 13 | 1.03 | 0.29 | 0.80 | 0.001 | 0.001 | 0.100 | 0.0044 | 0.00 | 0.00 | 836 | 15.9 | 1.0 | The invention |
| 14 | 1.03 | 0.29 | 0.80 | 0.001 | 0.001 | 0.200 | 0.0046 | 0.00 | 0.00 | 832 | 13.0 | 0.6 | The invention |
| 15 | 1.00 | 0.29 | 0.81 | 0.001 | 0.002 | 0.300 | 0.0034 | 0.00 | 0.00 | 817 | 11.0 | 0.5 | The invention |
| 16 | 1.00 | 0.30 | 0.80 | 0.001 | 0.002 | 0.610 | 0.0034 | 0.00 | 0.00 | 804 | 4.9 | 0.5 | The invention |
| 17 | 1.03 | 0.29 | 0.80 | 0.002 | 0.001 | 0.029 | 0.0048 | 0.00 | 0.03 | 843 | 13.4 | 1.7 | The invention |
| 18 | 1.03 | 0.29 | 0.80 | 0.002 | 0.001 | 0.026 | 0.0047 | 0.00 | 0.09 | 842 | 6.6 | 1.5 | The invention | the Jominy test specimen which had been subjected to water cooling was mechanically polished and a Rockwell hardness (HRC) test using the C scale conforming to JIS Z 2245 (2011) was conducted from the one end (water cooling end) at a constant spacing in the axial direction to obtain HRC distribution. The measurement spacing of HRC was arranged at a pitch of 1.0 mm to a position of 15 mm from the water cooling end, and at a pitch of 2.5 mm in a position of not less than 15 mm from the water cooling end.

Figure 12:
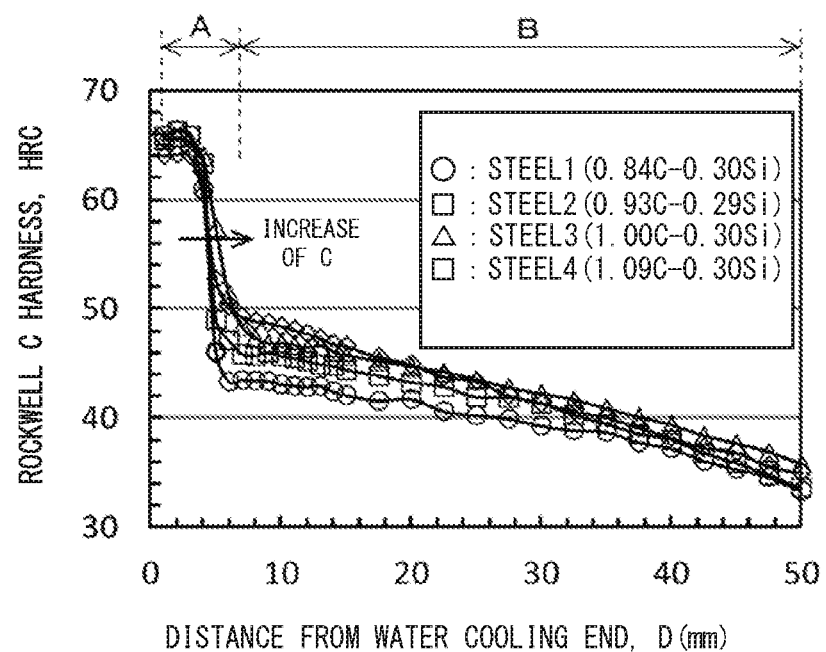
FIG. 12 is a diagram illustrating a Rockwell hardness HRC distribution (Jominy curve) for distances from the water cooling end of the Jominy test specimen obtained from the Jominy end-quenching test in Example.

One example of obtained HRC distribution is shown in FIG. 12. FIG. 12 shows results of Steel Nos. 1 to 4. Referring to FIG. 12, a Jominy curve was categorized, with reference to the hardness at the water cooling end of the test specimen, into a region "A" in which the hardness rapidly decreases as the distance from the water cooling end increases, and a region "B" which is located further apart from the water cooling end than the region A, and in which the hardness decreases more gradually than in the region A with respect to the distance from the water cooling end. As a result of structure observation, the region A corresponded to a quenched layer composed of martensite and/or bainite. The region B was a structure substantially composed of pearlite. A quenched layer depth was determined based on the HRC distribution as shown in FIG. 12.

[Microstructure Observation]

Microstructure observation at each distance from the water cooling end was conducted in the following way. With a measurement surface in the side face of the sample, where HRC measurement was conducted at each distance from the water cooling end of the Jominy test specimen, as an observation surface, the observation surface was mirror-finished by mechanical polishing, and thereafter was etched with a mixed solution of picric acid and sodium hydroxide. A photographic image is produced for any one visual field (200 μm×200 μm) in the observation surface after etching by using an optical microscope with a magnification of 500. Since pro-eutectoid cementite which was formed at a grain boundary of prior-austenite exhibited black color in the observation surface, it was possible to identify whether or not pro-eutectoid cementite was formed.

As shown in FIG. 11, two diagonal lines 101 were drawn in a square visual field 100 of 200 μm×200 μm. Then, the number of pieces of pro-eutectoid cementite that intersected with the two diagonal lines 101 was determined, By dividing the determined total number of pieces of pro-eutectoid cementite by a total length (5.66×100 μm) of the two diagonal lines 101, the amount of pro-eutectoid cementite per 100 μm (pieces/100 μm) was determined. That is, the amount of pro-eutectoid cementite was defined based on Formula (A).

If the amount of pro-eutectoid cementite was not more than 1.0 pieces/100 μm, it was determined that formation of pro-eutectoid cementite was suppressed. Numerical values listed corresponding to the distance from the water cooling end of each steel number in Table 4 each indicate the amount of pro-eutectoid cementite (pieces/100 μm). For example, the value (0.5) of cooling rate 13.1° C./sec (distance 13 mm from the water cooling end) of Test No. 4 means that in the test specimen of Test No. 4, the amount of pro-eutectoid cementite in a position at a distance of 13 mm in the axial direction from the water cooling end was 0.5 pieces/100 μm.

TABLE 4

| Steel No. | Jominy end-quench test | | | | | | | | | | | | | | | | | | | | | | | Formaster test | | Fn1 | Fn2 | Remarks |
|---|---|---|---|---|---|---|---|---|---|---|---|---|---|---|---|---|---|---|---|---|---|---|---|---|---|---|---|---|
| Distances from the water cooling end (mm) | 3 | 4 | 5 | 6 | 7 | 8 | 9 | 10 | 11 | 12 | 13 | 14 | 15 | 17.5 | 20 | 22.5 | 25 | 27.5 | 30 | 32.5 | 35 | 37.5 | 40 | | | | | |
| Cooling rate (°C/sec) | 148 | 85.7 | 59.4 | 42.4 | 33.5 | 27.4 | 22.9 | 19.5 | 16.9 | 14.8 | 13.1 | 11.7 | 10.5 | 8.3 | 6.8 | 5.7 | 4.8 | 4.2 | 3.7 | 3.2 | 2.9 | 2.6 | 2.4 | | | | | |
| 1 | ● | ● | ● | ● | ● | ● | ○ | ○ | ○ | ○ | ○ | ○ | ○ | ○ | ○ | ○ | ○ | ○ | ○ | ○ | ○ | ○ | ○ | 1.0 | 0.1 | 24.8 | 0.5 | The invention |
| 2 | ● | ● | ● | ● | ● | ● | ● | ○ | ○ | ○ | ○ | ○ | ○ | ○ | ○ | ○ | ○ | ○ | ○ | ○ | ○ | ○ | ○ | 0.3 | 1.6 | 21.7 | 0.6 | The invention |
| 3 | ● | ● | ● | ● | ● | ● | ● | ● | ● | ● | ○ | ○ | ○ | ○ | ○ | ○ | ○ | ○ | ○ | ○ | ○ | 0.3 | 2.4 | 4.8 | 18.8 | 1.2 | The invention |
| 4 | ● | ● | ● | ● | ● | ● | ● | ○ | ● | ● | 0.5 | ● | 0.3 | ○ | 0.5 | 0.8 | 2.1 | 2.4 | 1.6 | ○ | 2.9 | 3.5 | 3.2 | 5.1 | 6.1 | 16.0 | 6.1 | The invention |
| 5 | ● | ● | ● | ● | ● | ● | ● | ● | ● | ● | ● | ○ | ○ | ○ | ○ | ○ | ○ | ○ | ○ | ○ | ○ | ○ | ○ | 2.1 | 3.5 | 26.8 | 1.3 | The invention |
| 6 | ● | ● | ● | ● | ● | ● | ● | ● | ● | ● | ● | ● | ● | ● | ● | ○ | ○ | ○ | ○ | ○ | 0.5 | ○ | 1.1 | 3.7 | 3.2 | 5.7 | 3.2 | The invention |
| 7 | ● | ● | ● | ● | ● | ● | ● | ● | ● | ● | ○ | ○ | ○ | ○ | ○ | ○ | ○ | ○ | ○ | ○ | ○ | ○ | ○ | 2.1 | 2.9 | 26.2 | 2.0 | The invention |
| 8 | ● | ● | ● | ● | ● | ● | ● | ● | ● | ● | ● | ● | ● | ● | ● | ○ | ○ | ○ | ○ | ○ | ○ | ○ | ○ | 3.2 | — | 11.5 | 1.9 | The invention |
| 9 | ● | ● | ● | ● | ● | ● | ● | ● | ● | ● | ● | ○ | ○ | ○ | ○ | ○ | ○ | ○ | ○ | ○ | ○ | ○ | ○ | 2.4 | 2.9 | 13.6 | 3.4 | The invention |
| 10 | ● | ● | ● | ● | ● | ● | ● | ● | ○ | ○ | ○ | ○ | ○ | ○ | ○ | ○ | ○ | ○ | 0.3 | 0.5 | 0.5 | 0.8 | 1.3 | 4.0 | 4.0 | 11.0 | 2.7 | The invention |
| 11 | ● | ● | ● | ● | ● | ● | ● | ● | ● | ● | ● | ● | ● | ● | ● | ○ | ○ | ○ | 1.1 | 1.3 | 1.3 | 1.3 | 1.3 | 3.5 | 3.5 | 4.5 | 4.2 | The invention |
| 12 | ● | ● | ● | ● | ● | ● | ● | ● | ● | ○ | ○ | ○ | ○ | ○ | ○ | ○ | ○ | ○ | ○ | ○ | ○ | ○ | ○ | 2.9 | 2.9 | 17.3 | 1.4 | The invention |
| 13 | ● | ● | ● | ● | ● | ● | ● | ● | ● | ● | ○ | ○ | ○ | ○ | ○ | ○ | ○ | ○ | ○ | ○ | ○ | ○ | ○ | 2.7 | 2.9 | 15.9 | 1.0 | The invention |
| 14 | ● | ● | ● | ● | ● | ● | ● | ● | ● | ○ | ○ | ○ | ○ | ○ | ○ | ○ | ○ | ○ | ○ | ○ | ○ | ○ | ○ | 0.3 | 1.6 | 13.0 | 0.6 | The invention |

TABLE 4-continued

| Distances from the water cooling end (mm) | 3 | 4 | 5 | 6 | 7 | 8 | 9 | 10 | 11 | 12 | 13 | 14 | 15 | 17.5 | 20 | 22.5 | 25 | 27.5 | 30 | 32.5 | 35 | 37.5 | 40 | Formaster test 1.0 | Formaster test 0.1 | Fn1 | Fn2 | Remarks |
|---|---|---|---|---|---|---|---|---|---|---|---|---|---|---|---|---|---|---|---|---|---|---|---|---|---|---|---|---|
| Cooling rate (° C./sec) | 148 | 85.7 | 59.4 | 42.4 | 33.5 | 27.4 | 22.9 | 19.5 | 16.9 | 14.8 | 13.1 | 11.7 | 10.5 | 8.3 | 6.8 | 5.7 | 4.8 | 4.2 | 3.7 | 3.2 | 2.9 | 2.6 | 2.4 | | | | | |
| 15 | ● | ● | ● | ● | ● | ● | ● | ● | ○ | ○ | ○ | ○ | ○ | ○ | ○ | ○ | ○ | ○ | ○ | ○ | ○ | ○ | ○ | ○ | 0.3 | 11.0 | 0.5 | The invention |
| 16 | ● | ● | ● | ● | ● | ● | ● | ● | ● | ● | ● | ● | ● | ● | ○ | ○ | ○ | ○ | ○ | ○ | ○ | ○ | ○ | ○ | 0.3 | 4.9 | 0.5 | The invention |
| 17 | ● | ● | ● | ● | ● | ● | ● | ● | ● | ○ | ○ | ○ | ○ | ○ | ○ | ○ | ○ | ○ | ○ | ○ | ○ | ○ | ○ | 2.1 | — | 13.4 | 1.7 | The invention |
| 18 | ● | ● | ● | ● | ● | ● | ● | ● | ● | ● | ● | ● | ○ | ○ | ○ | ○ | ○ | ○ | ○ | ○ | ○ | ○ | ○ | 2.4 | — | 6.6 | 1.5 | The invention |

Next, the same observation surface is again mirror-finished by mechanical polishing and thereafter is etched by NITAL solution (mixed solution of nitric acid and ethanol). A photographic image was produced for any one visual field (200 μm×200 μm) in the observation surface after etching by using an optical microscope with a magnification of 500. Ferrite, bainite, martensite, and pearlite each have different contrasts, Therefore, based on the contrast, a quenched layer and pearlite in the observation surface were identified. The area fraction of pearlite was determined based on a total area of the identified pearlite and the area of the observation surface.

Note that the relationship between the distance from the water cooling end during the Jominy end-quench test and the cooling time from 800 to 500° C. is experimentally shown in literature data (F. Wever et al., Zur Frage der Warmebehandlung der Stahle auf Grund ihrer Zeit-Temperatur-Umwandlungs-Schaubilder, Stahl u Eisen, 74 (1954), p 749 to 761). Based on this literature data, a distance from the water cooling end was converted into an average cooling rate in a range from 800 to 500° C. at each position. The water cooling rate is shown corresponding to the distance from the water cooling end in Table 4.

[Formaster Test]

Using the above described Jominy test specimen, a continuous cooling test at a low cooling rate, which cannot be reproduced by the Jominy end-quench test, was conducted, A Formaster tester manufactured by Fuji Electronic Industrial Co., Ltd was used for the heat treatment. One test specimen with a diameter of 3 mm and a length of 10 mm was prepared from a round bar with a diameter of 40 mm for each of Steel Nos. 1 to 18. The test specimen was held at 950° C. for 5 minutes. Thereafter, the test specimen was cooled at a constant cooling rate of 1.0° C./sec. For the test specimen after cooling, the amount of pro-eutectoid cementite (pieces/100 μm) was calculated by the above described method.

For steel number in which pro-eutectoid cementite was not confirmed at a cooling rate of 1.0° C./sec, a continuous cooling heat treatment test at 0.1° C./sec was further conducted separately and the amount of pro-eutectoid cementite was determined by the same method as described above.

[Test Results]

Results are shown in Table 4. In Table 4, the symbol "●" in the column corresponding to the distance from the water cooling end indicates that the structure at that distance was a quenched layer (martensite and/or bainite). Moreover, the symbol "○" in the column corresponding to the distance from the water cooling end indicates that the structure at that distance was substantially composed of pearlite (area fraction of pearlite was 95% or more), no martensite or bainite was confirmed, and no pro-eutectoid cementite was confirmed either. The "numerical value" in the column corresponding to the distance from the water cooling end shows that the structure is substantially composed of pearlite (area fraction of pearlite is 95% or more), and indicates the number of pieces of pro-eutectoid cementite per 100 μm at that distance. Moreover, in each steel number in Table 4, a range in which the cooling rate (° C./sec) is not more than Fn1 defined by Formula (1), and not less than Fn2 defined by Formula (2) was outlined with double lines. Referring to Table 4, in a range of cooling rate outlined with double lines, no quenched layer was formed, and the amount of pro-eutectoid cementite was not more than 1.0 pieces/100 μm.

Referring to Tables 3 and 4, when the cooling rate was not less than Fn2 in any steel number, the amount of pro-eutectoid cementite became not more than 1.0 pieces/100 μm even if the steel was a hyper-eutectoid steel having a C content of 0.80 to 1.15%, thus suppressing formation of pro-eutectoid cementite. For that reason, it was expected that sufficient toughness would be secured in a railway wheel. Further, if the cooling rate was not more than Fn1, formation of a quenched layer was suppressed. For that reason, it was expected that sufficient toughness would be secured in a railway wheel. Therefore, it was found that if the intermediate product is cooled such that: the cooling rate in a range from 800 to 500° C. at the surface of the intermediate product other than the tread and the flange surface, that is the surface of the hub part, the surface of the web part, and the side face of the rim part (the surface of the rim part other than the tread and the flange surface) is not more than Fn1° C./sec; the cooling rate in a region where the cooling rate in a range from 800 to 500° C. is slowest in the intermediate product, that is, a region where the cooling rate is slowest in the interior of the hub part, the interior of the web part, and the interior of the rim part (hereinafter, referred to as a slowest region) is not less than Fn2. ° C. sec; the cooling rate in a range from 800 to 500° C. at the tread and the flange surface of the intermediate product is not less than Fn2° C./sec, the area fraction of pearlite will be 95% or more in any of the hub part, the web part, and the rim part, and the amount of pro-eutectoid cementite will be not more than 1.0 pieces/100 μm in the produced railway wheel so that formation of quenched layer can be suppressed at the surfaces of the hub part and the web part.

Example 2

Relationship between the amount of pro-eutectoid cementite and the Charpy impact value (J/cm$^2$) was investigated by using a round bar with a diameter of 40 mm of Steel No. 9 in Table 3. Four round bars of Steel No. 9 were held at 950° C. for 30 minutes, and thereafter cooled at a cooling rate shown in Table 5. The cooling rate was adjusted by immersing the round bar in a salt bath of various temperature.

TABLE 5

| Steel No. | cooling rate (° C./S) | Fn1 | Fn2 | Amount of pro-eutectoid cementite (pieces/μm) | Charpy impact values (J/cm$^2$) |
|---|---|---|---|---|---|
| 9-1 | 3.86 | 13.6 | 3.4 | 0.53 | 23.3 |
| 9-2 | 0.88 | 13.6 | 3.4 | 2.67 | 19.0 |
| 9-3 | 0.50 | 13.6 | 3.4 | 2.40 | 17.8 |
| 9-4 | 0.35 | 13.6 | 3.4 | 3.20 | 15.0 |

[Microstructure Observation]

A sample for microstructure observation was taken from a middle part of a round bar of each test number (9-1 to 9-4) after cooling. The observation surface of the sample was a plane perpendicular to the center axis of the round bar. The observation surface was mirror-finished by mechanical polishing, and thereafter the observation surface was etched with a mixed solution of picric acid and sodium hydroxide. A photographic image was produced for any one visual field (200 μm×200 μm) in the observation surface after etching by using an optical microscope with a magnification of 500. Since pro-eutectoid cementite which was formed at a grain boundary of prior-austenite exhibited black color in the observation surface, it was possible to identify whether or not pro-eutectoid cementite was formed. Moreover, the pearlite area fraction was determined by the same method as in Example 1. As a result, in any test number, the pearlite area fraction was 95% or more.

As shown in FIG. 11, two diagonal lines 101 were drawn in a square visual field 100 of 200 μm×200 μm. Then, a total sum of the number of pieces of pro-eutectoid cementite that intersect with these two diagonal lines 101 is determined. By dividing the determined total number of pieces of pro-eutectoid cementite by a total length (5.66×100 μm) of the two diagonal lines 101, the amount of pro-eutectoid cementite per 100 μm (pieces/100 μm) was determined. That is, the amount of pro-eutectoid cementite was defined based on Formula (A),

[Charpy Impact Test]

A Charpy test specimen (10 mm×10 mm×55 mm) was made from a round bar of each test number (9-1 to 9-4). The center axis of a Charpy test specimen corresponds to the center axis of the round bar. Using the Charpy test specimens, a Charpy impact test conforming to JIS Z 2242 (2005) was conducted at a room temperature (25° C.).

[Test Results]

Test results are shown in Table 5. Referring to Table 5, when the cooling rate was not less than Fn2 (3.4) (Steel No. 9-1), the amount of pro-eutectoid cementite was not more than 1.0 pieces/100 μm. For that reason, the Charpy impact value was as high as not less than 20.0 J/cm$^2$, and thus sufficient toughness was obtained. On the other hand, when the cooling rate was less than Fn2 (Steel Nos. 9-2 to 9-4), the Charpy impact value was as low as less than 20.0 J/cm$^2$.

Embodiments of the present invention have been described so far. However, the above described embodiments are merely examples for practicing the present invention. Therefore, the present invention will not be limited to the above described embodiments, and the present invention can be practiced by appropriately modifying the above described embodiments within a range not departing from the spirit thereof.

REFERENCE SIGNS LIST

1 Railway wheel
2 Hub part
3 Web part
4 Rim part
10 Cooling apparatus

The invention claimed is:

1. A railway wheel, comprising
a chemical composition consisting of, in mass %,
C: 0.86 to 1.15%,
Si: 1.00% or less,
Mn: 0.10 to 1.25%,
P: 0.050% or less,
S: 0.030% or less,
Al: 0.025 to 0.650%,
N: 0.0030 to 0.0200%,
Cr: 0 to 0.60%, and
V: 0 to 0.12%, with the balance being Fe and impurities, the railway wheel comprising:
a hub part,
a rim part including a tread and a flange, and
a web part disposed between the hub part and the rim part, wherein
in the microstructure of the hub part, the area fraction of pearlite is 95% or more, and the amount of pro-eutectoid cementite defined by Formula (A) is not more than 1.0 pieces/100 μm,
in the microstructure of the web part, the area fraction of pearlite is 95% or more, and the amount of pro-eutectoid cementite defined by Formula (A) is not more than 1.0 pieces/100 μm, and
in the microstructure of the rim part, the area fraction of pearlite is 95% or more, and the amount of pro-eutectoid cementite defined by Formula (A) is not more than 1.0 pieces/100 μm:
where Formula (A) is given by amount of pro-eutectoid cementite (pieces/100 μm)=a total sum of the number of pieces of pro-eutectoid cementite which intersect with two diagonal lines in a square visual field of 200 μm×200 μm/(5.66×100 μm), where 5.66×100 μm is equal to a total length of the two diagonal lines.

2. The railway wheel according to claim 1, wherein the chemical composition contains one or more elements selected from the group consisting of,
Cr: 0.02 to 0.60%, and
V: 0.02 to 0.12%.

* * * * *